United States Patent
O'Hara et al.

(10) Patent No.: US 12,030,644 B2
(45) Date of Patent: Jul. 9, 2024

(54) SEAT SYSTEM WITH ADAPTIVELY ADJUSTABLE SEATING SURFACES

(71) Applicant: Gulfstream Aerospace Corporation, Savannah, GA (US)

(72) Inventors: Timothy O'Hara, Savannah, GA (US); Joe Guthrie, Savannah, GA (US); Allen Davis, Savannah, GA (US); Kyle Kincaid, Savannah, GA (US); Jeremiah Mallette, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 276 days.

(21) Appl. No.: 17/657,915

(22) Filed: Apr. 4, 2022

(65) Prior Publication Data
US 2023/0312105 A1 Oct. 5, 2023

(51) Int. Cl.
*B64D 11/06* (2006.01)
*A47C 1/032* (2006.01)
*B60N 2/34* (2006.01)

(52) U.S. Cl.
CPC ...... *B64D 11/0641* (2014.12); *A47C 1/03294* (2013.01); *B60N 2/34* (2013.01); *B64D 11/06395* (2014.12); *B64D 11/064* (2014.12); *B64D 11/0643* (2014.12)

(58) Field of Classification Search
CPC ... B64D 11/0641; B60N 2/34; A47C 1/03294; A47C 1/143; A61G 7/015
See application file for complete search history.

(56) References Cited

U.S. PATENT DOCUMENTS

| | | | |
|---|---|---|---|
| 5,209,549 A * | 5/1993 | Chang | A47C 1/03255 297/320 |
| 5,505,520 A | 4/1996 | Frusti et al. | |
| 7,607,738 B2 | 10/2009 | Gregory et al. | |
| 7,802,846 B2 * | 9/2010 | Bellefleur | A47C 1/0244 297/307 |
| 9,211,824 B2 | 12/2015 | Arant et al. | |
| 10,266,271 B2 * | 4/2019 | Udriste | B64D 11/0641 |
| 10,398,232 B2 | 9/2019 | Limpaitoon | |

(Continued)

FOREIGN PATENT DOCUMENTS

| | | | | |
|---|---|---|---|---|
| DE | 102021202190 A1 * | 9/2022 | | |
| EP | 3805105 A1 * | 4/2021 | | A61B 5/6887 |

(Continued)

*Primary Examiner* — Timothy J Brindley
(74) *Attorney, Agent, or Firm* — Lorenz & Kopf, LLP

(57) ABSTRACT

A seat system includes a base support structure having at least one flat seat support surface, a seat pan support structure movably coupled to the base support structure and having at least one contoured seat support surface, and a back rest support structure movably coupled to the base support structure. The back rest support structure includes a primary frame having at least one flat back support surface, and an articulating frame movably coupled to the primary frame and having at least one contoured back support surface. The seat system also includes a back rest cushion having an occupant-facing back rest surface, and an articulating arrangement of back rest cushion support members movably coupled together to define a bottom surface of the back rest cushion opposing the occupant-facing back rest surface.

20 Claims, 31 Drawing Sheets

(56) References Cited

U.S. PATENT DOCUMENTS

| | | | |
|---|---|---|---|
| 10,786,087 B2 * | 9/2020 | Huang | A47C 20/10 |
| 11,224,294 B2 * | 1/2022 | Nava | A47C 20/041 |
| 11,634,048 B2 * | 4/2023 | Tanaka | B60N 2/0248 |
| | | | 297/284.3 |
| 2003/0189360 A1 * | 10/2003 | Laurent | B64D 11/0641 |
| | | | 297/83 |
| 2004/0036336 A1 * | 2/2004 | Veneruso | B64D 11/064 |
| | | | 297/184.14 |
| 2017/0015423 A1 * | 1/2017 | Udriste | B60N 2/77 |
| 2021/0107660 A1 * | 4/2021 | Oshita | B64D 11/0647 |
| 2022/0183907 A1 * | 6/2022 | Liu | A61G 7/015 |
| 2022/0330700 A1 * | 10/2022 | Pearse | A47C 1/03255 |
| 2023/0293371 A1 * | 9/2023 | Su | A61G 7/018 |
| | | | 5/618 |
| 2023/0406511 A1 * | 12/2023 | OHara | B60N 2/66 |

FOREIGN PATENT DOCUMENTS

| | | | | |
|---|---|---|---|---|
| JP | 2005185686 A | * | 7/2005 | |
| JP | 2009536541 A | | 10/2009 | |
| JP | 2012075791 A | | 4/2012 | |
| JP | 5387174 B2 | | 1/2014 | |
| WO | WO-2006033750 A2 | * | 3/2006 | A47C 17/22 |
| WO | WO-2011048384 A1 | * | 4/2011 | A47C 1/024 |
| WO | 2012053022 A1 | | 4/2012 | |
| WO | 2016044517 A1 | | 3/2016 | |

\* cited by examiner

SEAT SYSTEM WITH ADAPTIVELY ADJUSTABLE SEATING SURFACES

TECHNICAL FIELD

Embodiments of the subject matter described herein relate generally to seats and seating systems of the type suitable for use in vehicles, such as aircraft. More particularly, embodiments of the subject matter relate to a reclining seat system that includes seating surfaces with adaptively adjustable contours.

BACKGROUND

Adjustable seats and related seating systems are commonly used in different vehicle applications, including aircraft, automobiles, trains, and buses. Most aircraft seats, for example, can be manually or electronically adjusted to change the angle of recline. As another example, the fore/aft position of some aircraft seats can be manually or electronically adjusted to some extent. As yet another example, most aircraft seats designed for business class or premium class passengers can be manually or electronically adjusted between an upright seating position and a flat (sleeping) position.

BRIEF SUMMARY

A seat system is disclosed here. An embodiment of the seat system includes: a base support structure having at least one flat seat support surface; a seat pan support structure movably coupled to the base support structure, the seat pan support structure having at least one contoured seat support surface; a seat cushion; and an electronically controlled actuation system that is activatable to adjust the seat system between an upright position and a flat position inclusive. The seat cushion includes: an occupant-facing seat surface; and an articulating arrangement of seat cushion support members movably coupled together to define a bottom surface of the seat cushion opposing the occupant-facing seat surface of the seat cushion. The at least one contoured seat support surface supports the seat cushion when the seat system is in the upright position, such that the articulating arrangement of seat cushion support members physically adapts to comply with the at least one contoured seat support surface. The at least one flat seat support surface supports the seat cushion when the seat system is in the flat position, such that the articulating arrangement of seat cushion support members physically adapts to comply with the at least one flat seat support surface.

An alternative seat system is also disclosed here. An embodiment of this seat system includes: a base support structure; a back rest support structure movably coupled to the base support structure; a back rest cushion; and an electronically controlled actuation system that is activatable to adjust the seat system between an upright position and a flat position inclusive. The back rest support structure includes: a primary frame having at least one flat back support surface; and an articulating frame movably coupled to the primary frame, the articulating frame having at least one contoured back support surface. The back rest cushion includes: an occupant-facing back rest surface; and an articulating arrangement of back rest cushion support members movably coupled together to define a bottom surface of the back rest cushion opposing the occupant-facing back rest surface. The at least one contoured back support surface supports the back rest cushion when the seat system is in the upright position, such that the articulating arrangement of back rest cushion support members physically adapts to comply with the at least one contoured back support surface. The at least one flat back support surface supports the back rest cushion when the seat system is in the flat position, such that the articulating arrangement of back rest cushion support members physically adapts to comply with the at least one flat back support surface.

Another seat system is also disclosed here. An embodiment of this seat system includes: a base support structure having at least one flat seat support surface; a seat pan support structure movably coupled to the base support structure, the seat pan support structure having at least one contoured seat support surface; a back rest support structure movably coupled to the base support structure; a seat cushion; a back rest cushion; and an electronically controlled actuation system that is activatable to adjust the seat system between an upright position and a flat position inclusive. The back rest support structure includes: a primary frame comprising at least one flat back support surface; and an articulating frame movably coupled to the primary frame, the articulating frame having at least one contoured back support surface. The seat cushion includes: an occupant-facing seat surface; and an articulating arrangement of seat cushion support members movably coupled together to define a bottom surface of the seat cushion opposing the occupant-facing seat surface of the seat cushion. The back rest cushion includes: an occupant-facing back rest surface; and an articulating arrangement of back rest cushion support members movably coupled together to define a bottom surface of the back rest cushion opposing the occupant-facing back rest surface. The at least one contoured seat support surface supports the seat cushion when the seat system is in the upright position, such that the articulating arrangement of seat cushion support members physically adapts to comply with the at least one contoured seat support surface. The at least one contoured back support surface supports the back rest cushion when the seat system is in the upright position, such that the articulating arrangement of back rest cushion support members physically adapts to comply with the at least one contoured back support surface. The at least one flat seat support surface supports the seat cushion when the seat system is in the flat position, such that the articulating arrangement of seat cushion support members physically adapts to comply with the at least one flat seat support surface. The at least one flat back support surface supports the back rest cushion when the seat system is in the flat position, such that the articulating arrangement of back rest cushion support members physically adapts to comply with the at least one flat back support surface.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 12 corresponds to the upright position of the adjustable seat system;

FIG. 13 corresponds to the upright position of the adjustable seat system, which is also shown in FIG. 12;

FIG. 14 corresponds to the upright position of the adjustable seat system, which is also shown in FIG. 12 and FIG. 13;

FIG. 15 corresponds to the upright position of the adjustable seat system, which is also shown in FIGS. 12-14;

FIG. 16 corresponds to the upright position of the adjustable seat system, which is also shown in FIGS. 12-15;

FIG. 17 corresponds to a reclined position of the adjustable seat system;

FIG. 18 corresponds to a reclined position of the adjustable seat system, which is also shown in FIG. 17;

FIG. 19 corresponds to a reclined position of the adjustable seat system, which is also shown in FIG. 17 and FIG. 18;

FIG. 20 corresponds to a reclined position of the adjustable seat system, which is also shown in FIGS. 17-19;

FIG. 21 corresponds to a reclined position of the adjustable seat system, which is also shown in FIGS. 12-15;

FIG. 22 corresponds to a flat position of the adjustable seat system;

FIG. 23 corresponds to the flat position of the adjustable seat system, which is also shown in FIG. 22;

FIG. 24 corresponds to the flat position of the adjustable seat system, which is also shown in FIG. 22 and FIG. 23;

FIG. 25 corresponds to the flat position of the adjustable seat system, which is also shown in FIGS. 22-24;

FIG. 26 corresponds to the flat position of the adjustable seat system, which is also shown in FIGS. 22-25;

FIGS. 27-31 illustrate adjustable bolster features.

DETAILED DESCRIPTION

Figure 1:
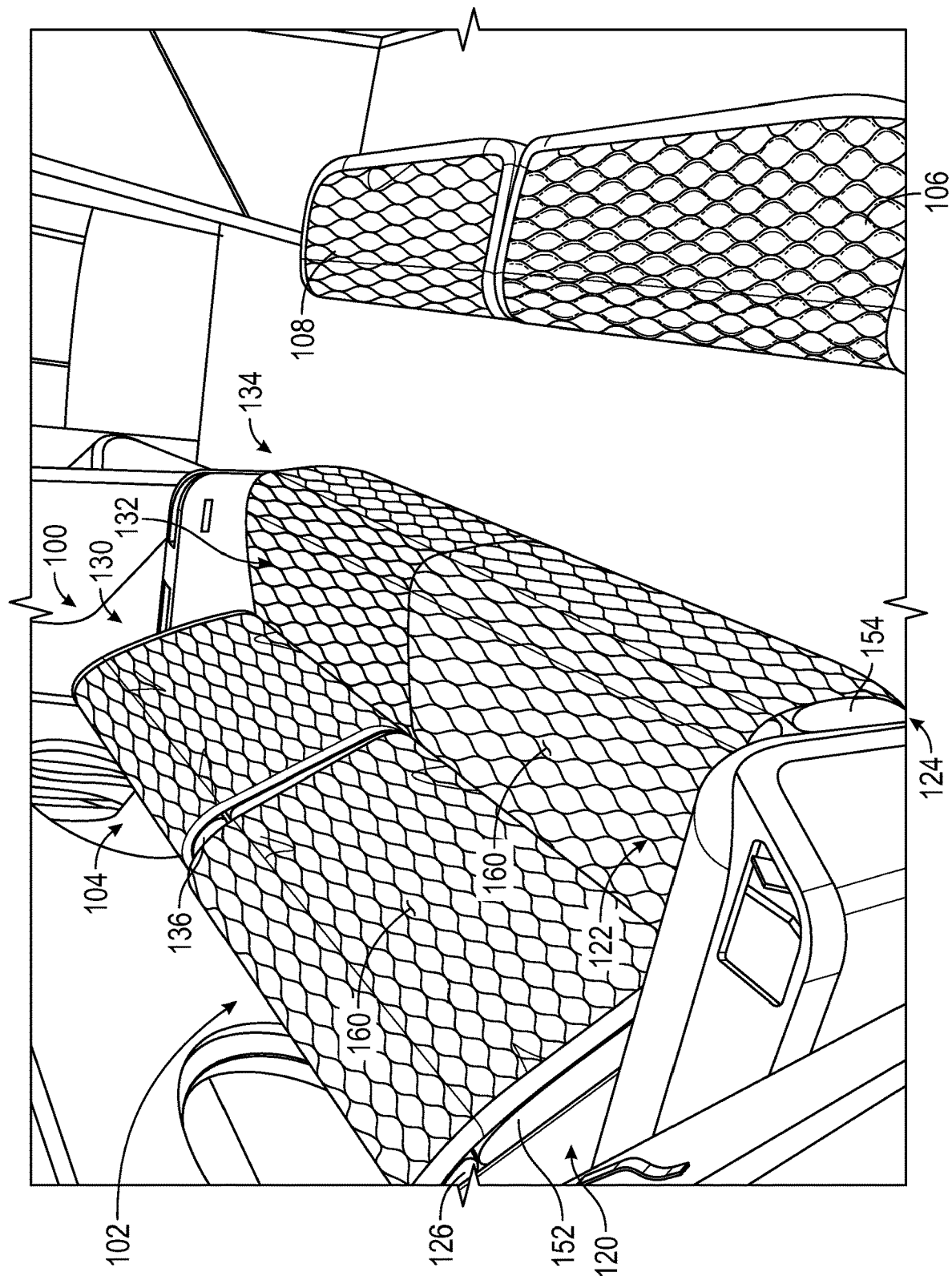
FIG. 1 is a perspective view of an exemplary embodiment of an adjustable seating arrangement that includes two side-by-side seat systems, both depicted in their upright positions.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

A movable seat and related seat system are disclosed herein. In accordance with certain non-limiting embodiments, the seat system is deployed onboard a vehicle such as an aircraft, a train, a bus, or a watercraft. However, it should be appreciated that embodiments of the disclosed seat system can be utilized for commercial, residential, or other applications. The exemplary implementation shown and described here relates to a movable seat system onboard an aircraft, wherein the seating position of the seat system is adjustable between an upright position and a flat position, inclusive. At least one passenger cushion (e.g., a seat cushion, a back rest cushion, a head rest cushion, and/or a leg cushion) is arranged and configured as a "shape-shifting" cushion having a variable surface contour that changes in response to adjustment of the seating position. For example, when the seat system is in a flat position (e.g., a configuration intended to accommodate a sleeping passenger), the cushions exhibit a relatively flat shape. In contrast, when the seat system is in an upright position or in a reclined or relaxed position, one or more of the passenger cushions are physically manipulated to provide a desired shape or contour intended to enhance passenger comfort.

Referring to the drawings, FIGS. 1-5 are perspective views of an adjustable seating arrangement 100 in different positions. The embodiment of the seating arrangement 100 shown in FIGS. 1-5 includes two side-by-side seat systems 102, 104 with corresponding movable ottoman components 106, 108 (the ottoman component 106 cooperates with the seat system 102, and the ottoman component 108 cooperates with the seat system 104). As described in more detail below, each ottoman component 106, 108 is controlled to automatically move in concert with adjustment of its associated seat system 102, 104. Although the arrangement depicted in FIGS. 1-5 includes a pair of seat systems 102, 104, a deployment may include only one seat system or more than two side-by-side seat systems.

Figure 2:
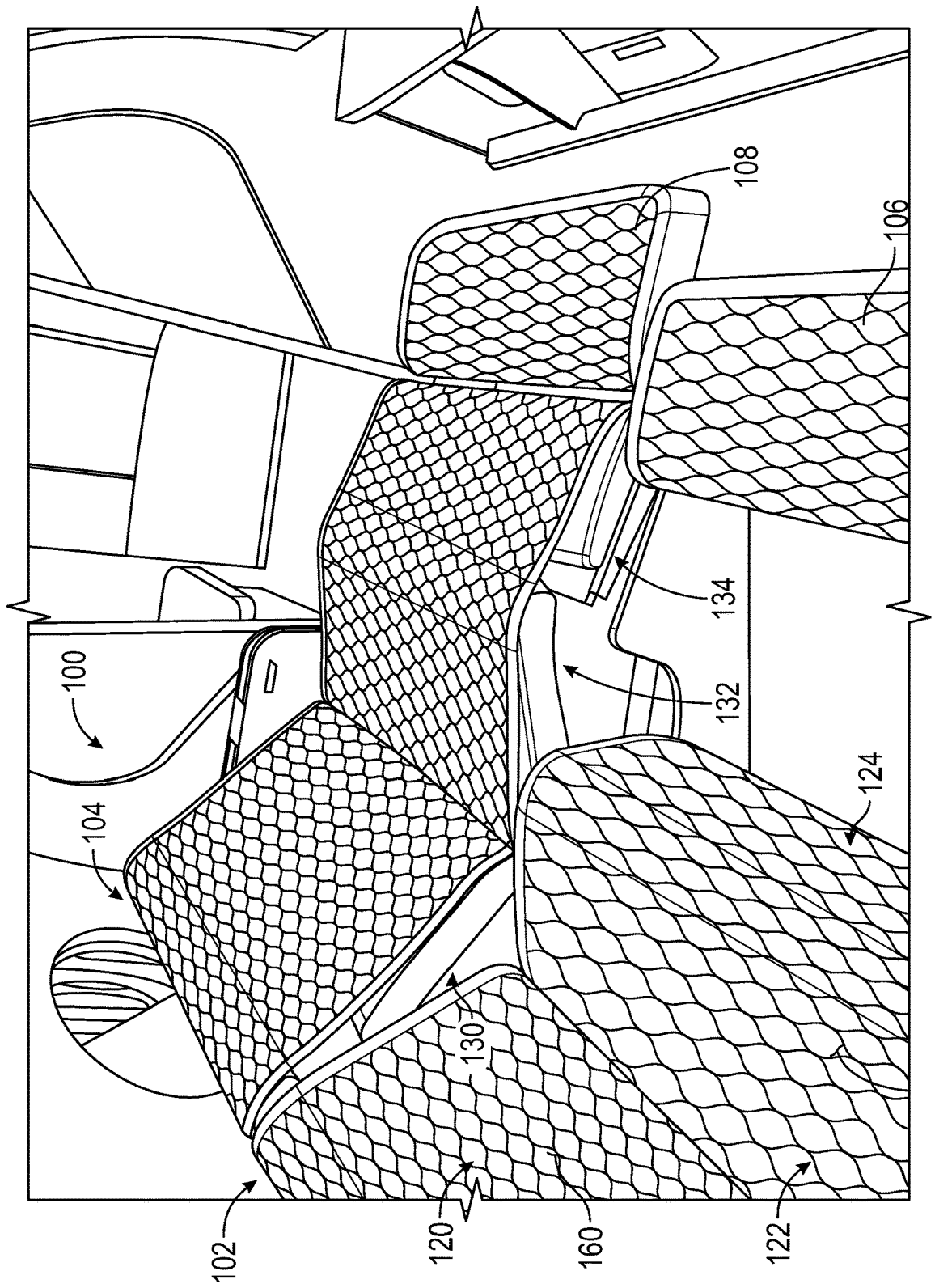
FIG. 2 is a perspective view of the adjustable seating arrangement shown in FIG. 1, with one seat system depicted in its upright position and one seat system depicted in a reclined position.
Figure 3:
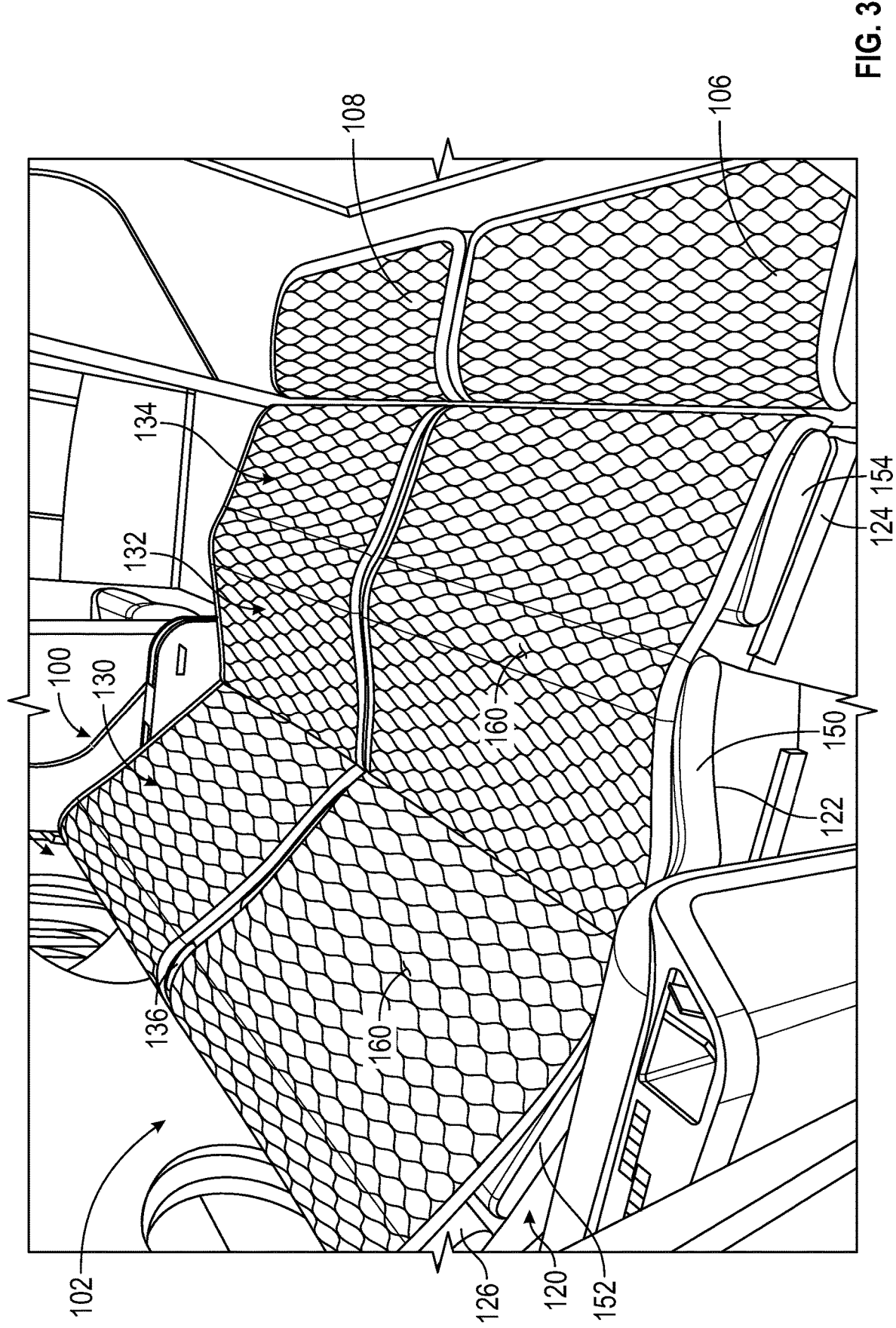
FIG. 3 is a perspective view of the adjustable seating arrangement shown in FIG. 1, with both seat systems depicted in reclined positions.
Figure 4:
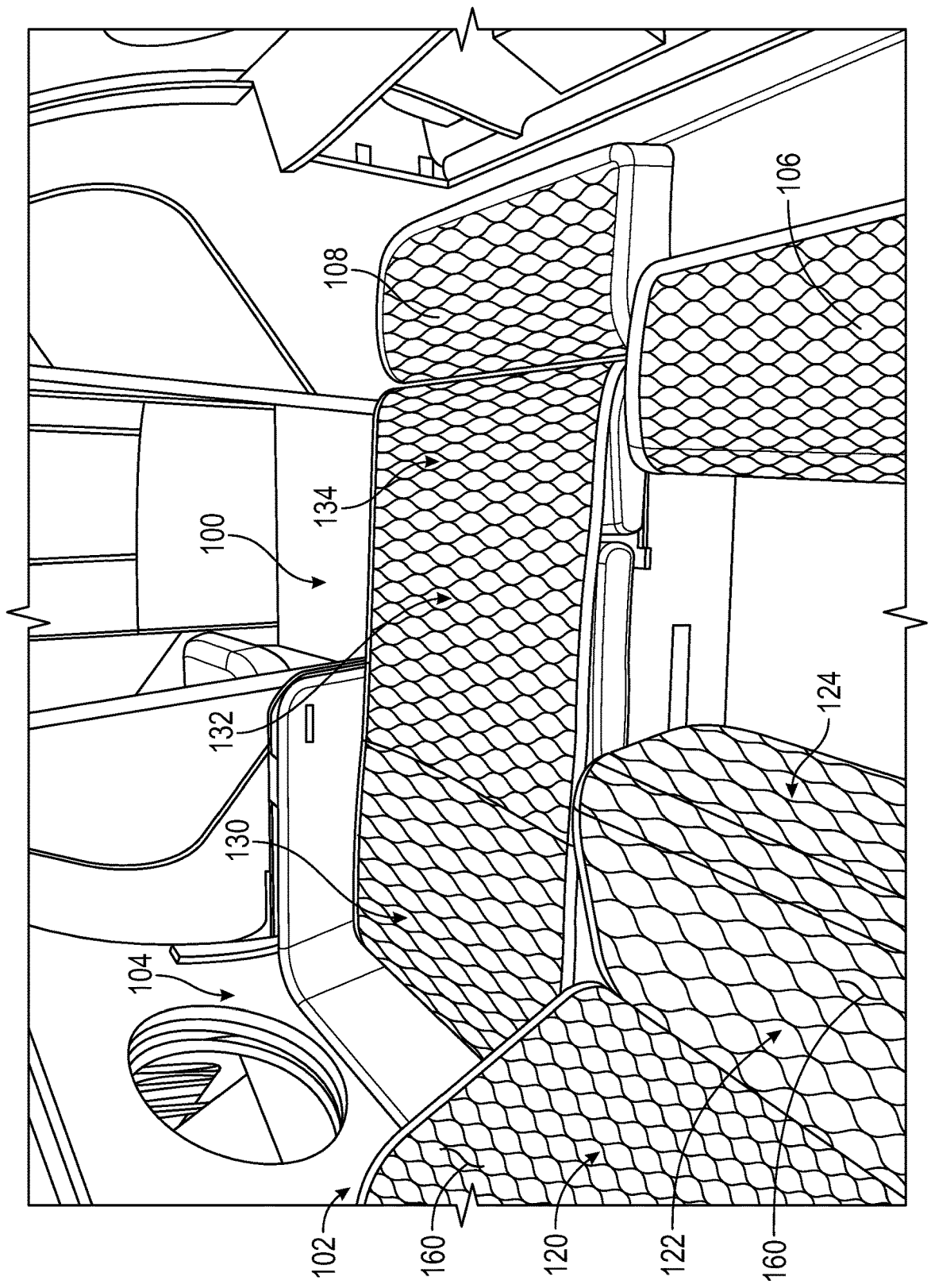
FIG. 4 is a perspective view of the adjustable seating arrangement shown in FIG. 1, with one seat system depicted in its upright position and one seat system depicted in a flat position.
Figure 5:
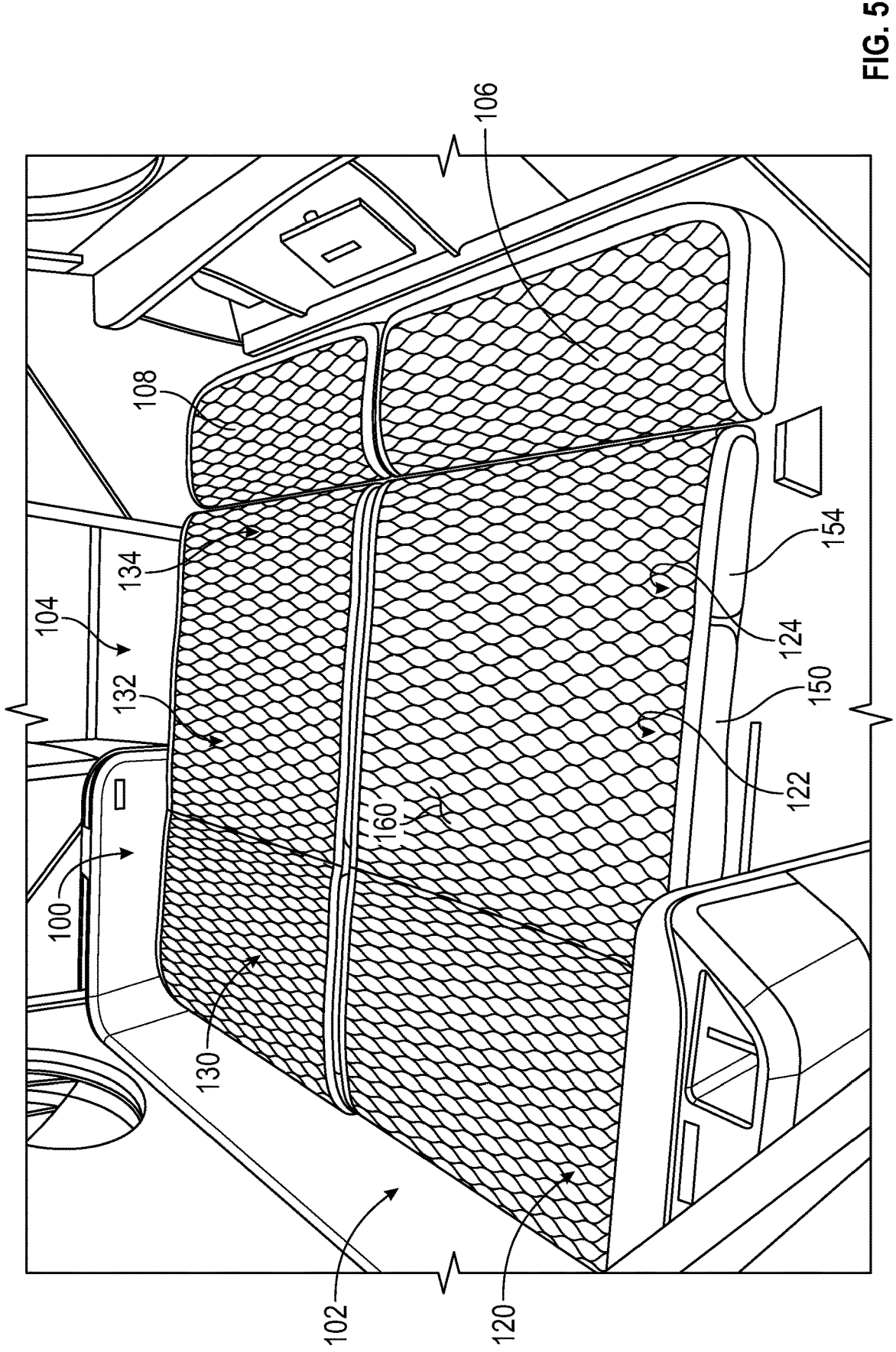
FIG. 5 is a perspective view of the adjustable seating arrangement shown in FIG. 1, with both seat systems depicted in flat positions.
Figure 6:
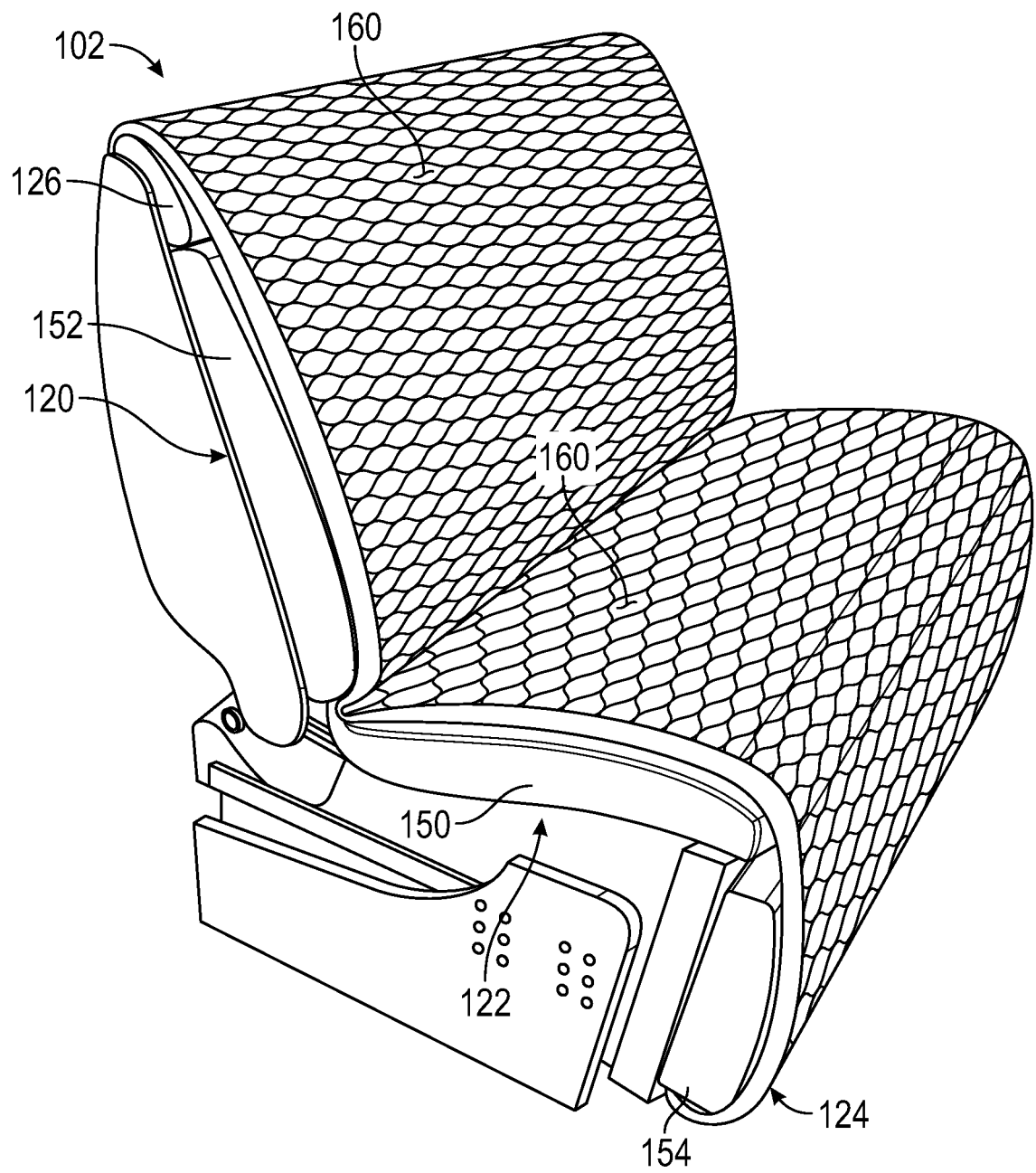
FIG. 6 is a side perspective view of an adjustable seat system depicted in its upright position.
Figure 7:
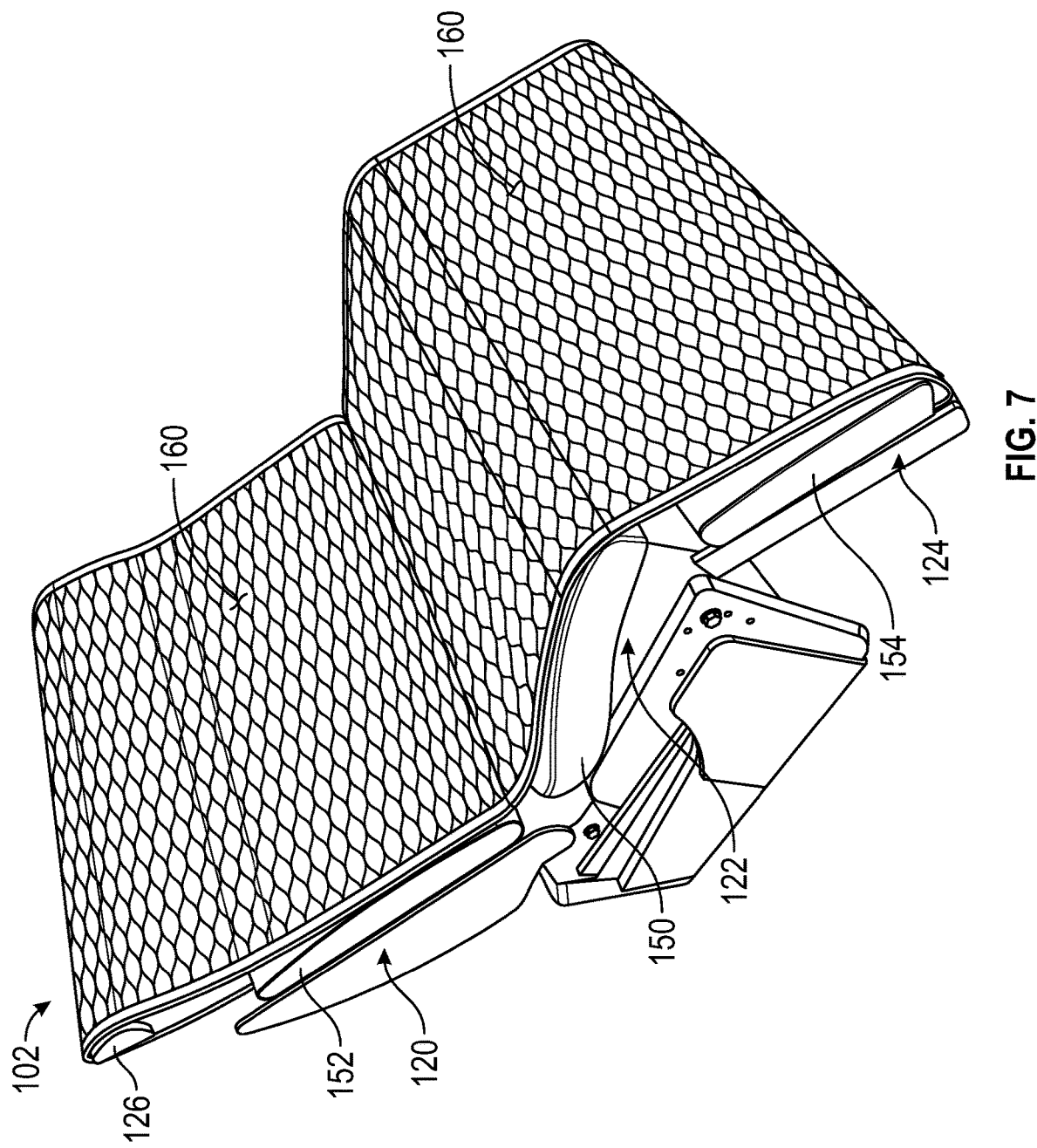
FIG. 7 is a side perspective view of the adjustable seat system shown in FIG. 6, depicted in a reclined position.
Figure 8:
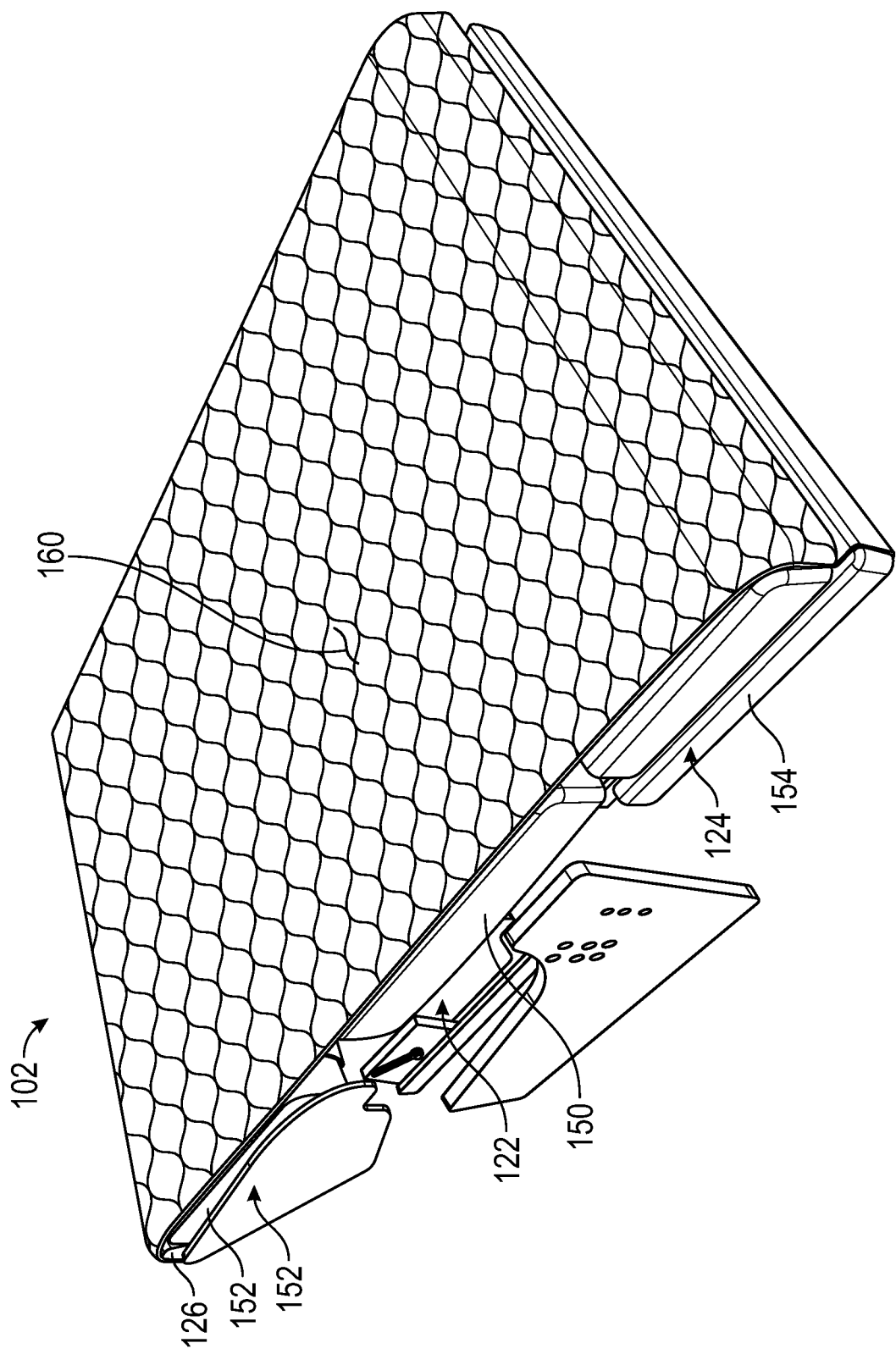
FIG. 8 is a side perspective view of the adjustable seat system shown in FIG. 6, depicted in a flat position.

The position of each of the seat systems 102, 104 is adjustable (manually or electronically). In certain embodiments, the seating arrangement 100 includes at least one electronically controlled actuation system that is activatable to adjust the seat systems 102, 104 between upright positions and flat (sleeping) positions, inclusive, with any number of intermediate positions between the upright and flat positions. In this regard, FIG. 1 depicts both seat systems 102, 104 in their upright positions; FIG. 2 depicts the seat system 102 in its upright position and the seat system 104 in a reclined position; FIG. 3 depicts both seat systems 102, 104 in reclined positions; FIG. 4 depicts the seat system 102 in its upright position and the seat system 104 in a flat position; and FIG. 5 depicts both seat systems 102, 104 in flat positions. FIG. 6 is a side perspective view of the seat system 102 by itself, depicted in its upright position; FIG. 7 is a side perspective view of the seat system 102 by itself, depicted in a reclined position; and FIG. 8 is a side perspective view of the seat system 102 by itself, depicted in a flat position.

Figure 9:
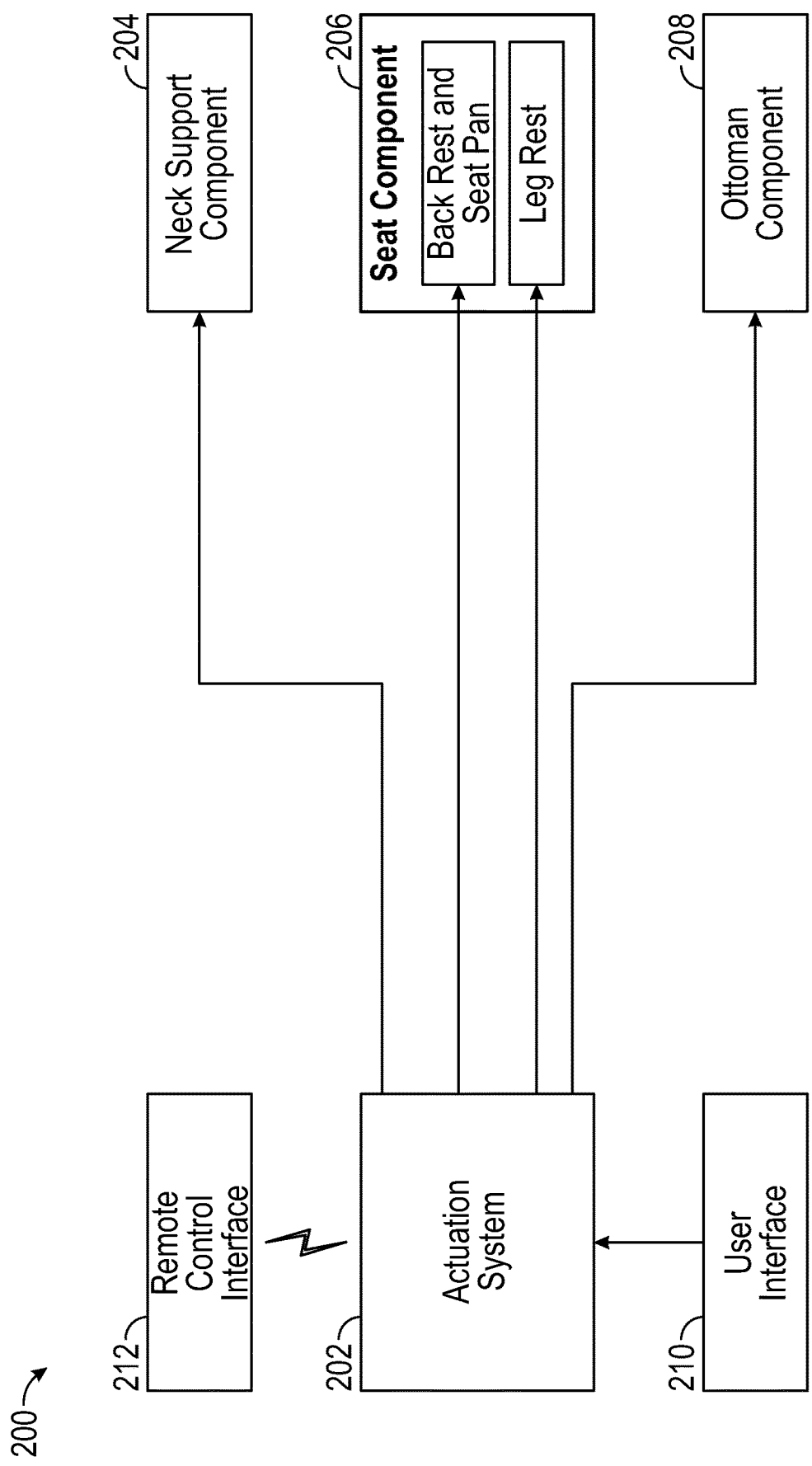
FIG. 9 is a block diagram representation of an exemplary embodiment of a control system suitable for use with an adjustable seat system of the type disclosed herein.

FIG. 9 is a simplified block diagram representation of a control system 200 suitable for use with an adjustable seat system of the type disclosed herein. For example, each of the seat systems 102, 104 may include or cooperate with a respective instantiation of the control system 200. The heart of the control system 200 is an electronically controlled actuation system 202 that is designed, programmed, and otherwise configured to control the adjustment of at least one movable component of the seat system. The illustrated embodiment is suitable for use with a seat system having a powered neck support component 204, a powered seat component 206, and a powered ottoman component 208.

The neck support component 204 can be controlled to automatically move in concert with adjustment of the seat system into the reclined position. In this regard, the neck support component 204 can be controlled to move up and forward only when the seat system is adjusted into the reclined position, and to automatically retract when the seat system is adjusted into the upright or flat positions (neck support isn't necessary in those positions). Alternatively or additionally, the neck support component 204 can be controlled on demand by the occupant. In certain environments, however, activation of the neck support component 204 may be disabled or limited to prevent interference or contact with surrounding structures (e.g., paneling or trim surrounding the seat system, an interior wall of an aircraft cabin, a cabinet, a bulkhead, or the like).

The seat component 206 represents the primary element of the seat system. As described in more detail below, the seat component 206 includes three main sections that can move relative to one another as the seat system travels between the upright and flat positions. These main sections include a back rest section, a seat pan section, and a leg rest section. FIG. 9 depicts the back rest section and the seat pan section as a combined block having a corresponding control signal or channel from the actuation system 202, and depicts the leg rest section as a separate block having a respective control signal or channel from the actuation system 202. In certain embodiments, the leg rest section is controlled independently relative to the back rest section and the seat pan section, which can be controlled in concert. However, the leg rest section can deploy automatically once the seat reaches a predetermined recline angle. The seat component 206 can be controlled to adjust its recline position. In certain embodiments, the seat component 206 can also be controlled to move forward and backward. In certain embodiments, the seat component 206 can also be controlled to adjust its height, or the height can be manually adjusted during installation (and need not be implemented as a user-adjustable setting).

The ottoman component 208 can be controlled to automatically move (forward and backward) in concert with adjustment of the seat system into the flat position. This allows the ottoman component 208 to extend the effective length of the seat system to accommodate a sleeping or resting occupant. Alternatively or additionally, the ottoman component 208 can be controlled on demand by the occupant. In certain environments, however, activation of the ottoman component 208 may be disabled or limited to prevent interference or contact with surrounding structures (e.g., paneling or trim surrounding the seat system, an interior wall of an aircraft cabin, a cabinet, a bulkhead, or the like).

The actuation system 202 can be activated (e.g., in response to user or occupant inputs) to generate appropriate commands, control signals, and/or outputs that regulate movement, motion, or articulation of the movable components of the seat system. The actuation system 202 is activatable to adjust the seat system into various seating positions including, without limitation: an upright position; a flat position; and at least one reclined position that resides between the upright and flat positions. To this end, the actuation system 202 may generate and issue any of the following commands and control signals, without limitation: UP and DOWN commands for the neck support component 204; RECLINE POSITION commands for the seat component 206; FORWARD and BACKWARD commands for the seat component 206; HEIGHT commands for the seat component 206; FORWARD and BACKWARD commands for the ottoman component 208; HEIGHT commands for the ottoman component 208; and TILT commands for the ottoman component 208. In certain embodiments, the actuation system 202 can generate and issue independent commands or control signals associated with adjustment of the leg rest section of the seat component 206. The commands, control signals, and/or outputs produced by the actuation system 202 activate and regulate the operation of one or more electrical, mechanical, electromechanical, magnetic, pneumatic, and/or other elements of the seat system, resulting in movement of one or more of the movable components into the desired position(s). In practice, the actuation system 202 may initiate movement or activation of various internal structures, parts, and components of the seat system, which may include, without limitation: gears; mechanical linkages; pushrods; hinges; bearings; joints; motors; support structures; frame elements; plates; wheels; pulleys; belts; or the like.

The actuation system 202 may respond to commands, settings, or instructions obtained from a user interface 210. In this regard, the user interface 210 may be an integrated element of the seat system, e.g., a control panel or a touchscreen display with various buttons, switches, knobs, or other human-machine interface items. Alternatively or additionally, the actuation system 202 may respond to commands, settings, or instructions obtained from a remote control interface 212. In this regard, the remote control interface 212 may be realized with a devoted remote control device assigned to the seat system. In some implementations, the remote control interface 212 may be realized as a suitably written application running on a mobile device owned or operated by the occupant, e.g., a mobile phone app, a smart watch app, or the like. In yet other implementations, the remote control interface 212 may be implemented as a feature or application of the passenger entertainment system onboard an aircraft, a train, a ferry, or the like.

Referring again to FIGS. 1-8, the seat system 102 includes a back rest section 120, a seat section 122, a leg rest section 124, and a powered neck support component 126. The seat system 104 also includes a back rest section 130, a seat section 132, a leg rest section 124, and a powered neck support component 136. FIG. 1 shows both seat systems 102, 104 in their upright positions, and FIG. 6 shows only one seat system (e.g., seat system 102) in its upright position. In an aircraft application, the upright position corresponds to the taxi, takeoff, and landing (TTL) seat position. As shown in FIG. 1, when the seat systems 102, 104 are in their upright positions, the leg rest sections 124, 134 are retracted (i.e., pulled inward toward the back rest sections 120, 130) and the corresponding ottoman components 106, 108 are positioned to provide ample legroom for the occupants. Moreover, the neck support components 126, 136 are fully retracted (i.e., moved toward the tops of the back rest sections 120, 130) when the seat systems 102, 104 are in their upright positions.

FIG. 5 shows both seat systems 102, 104 in flat positions (suitable for sleeping), and FIG. 8 shows only one seat system (e.g., seat system 102) in a flat position. As shown in FIG. 5, when the seat systems 102, 104 are in flat positions, the back rest sections 120, 130, the seat sections 122, 132, and the leg rest sections 124, 134 are positioned to create a nominally flat surface for the occupants. Furthermore, the ottoman components 106, 108 are positioned to be adjacent to and abut (or nearly abut) the terminating edges of the leg rest sections 124, 134 (see FIG. 5). The adjustment and positioning of the ottoman components 106, 108 in this manner is desirable to create a longer sleeping surface for the occupants that provides additional legroom.

The seat systems 102, 104 can be adjusted into at least one intermediate seating position between upright and flat positions. In certain embodiments, for example, the seat systems 102, 104 can be continuously adjusted into any intermediate position between upright and flat positions. In some embodiments, the seat systems 102, 104 can be adjusted into one or more predefined or assigned intermediate positions between upright and flat positions. The exemplary embodiment described here assumes that the seat systems 102, 104 can be adjusted into at least one reclined position that resides between upright and flat positions.

FIG. 3 shows both seat systems 102, 104 in reclined positions, and FIG. 7 shows only one seat system (e.g., seat system 102) in a reclined position. As shown in FIG. 3, when the seat systems 102, 104 are in reclined positions, the back rest sections 120, 130 are reclined, the seat sections 122, 132 are tilted at a slight upward angle (where the fronts of the seat sections 122, 132 are higher than the backs of the seat sections 122, 132), and the leg rest sections 124, 134 are angled downward (where the fronts of the leg rest sections 124, 134 are lower than the backs of the leg rest sections 124, 134). Moreover, the neck support components 126, 136 may be fully extended (i.e., moved away from the tops of the back rest sections 120, 130) when the seat systems 102, 104 are in reclined positions. In accordance with the embodiment depicted in FIG. 3, the ottoman components 106, 108 are positioned to be adjacent to and abut (or nearly abut) the terminating edges of the leg rest sections 124, 134 (see FIG. 3).

In certain embodiments, each seat system 102, 104 is independently controllable and independently adjustable. In this regard, FIG. 2 depicts the seat system 102 in the upright position and the seat system 104 in a reclined position. As another example, FIG. 4 depicts the seat system 102 in the upright position and the seat system 104 in a flat position. Although this description highlights three common pre-set seat positions (e.g., upright, reclined, and flat), it may be possible to adjust each seat system 102, 104 into additional and/or alternative positions, depending on the particular embodiment of the seating arrangement.

The seat systems 102, 104 include various support structures (e.g., supporting hardware, frame components, structural members, and other elements) that carry and support occupant cushions. For simplicity and brevity, the following description refers to the seat system 102 and its corresponding components; the description of the seat system 102 also applies to the seat system 104. The embodiments disclosed here include a seat cushion 150 (which may be considered to be part of the seat section), a back rest cushion 152 (which may be considered to be part of the back rest section), and a leg cushion 154 (which may be considered to be part of the leg rest section). The seat cushion 150 is labeled in FIGS. 3 and 5-8. The back rest cushion 152 is labeled in FIGS. 1, 3, and 6-8. The leg cushion 154 is labeled in FIGS. 1, 3, and 5-8. The neck support component 126 and the ottoman component 106 may also include corresponding cushions (not separately labeled).

At least a portion of the neck support component 126, at least a portion of the back rest cushion 152, at least a portion of the seat cushion 150, and at least a portion of the leg cushion 154 may be covered and protected by a blanket assembly 160. For the illustrated embodiment, the blanket assembly 160 covers the occupant-facing surfaces of the cushions. The blanket assembly 160 may be attached to suitable portions of the underlying support structure or framework of the seat system 102. Alternatively or additionally, selective areas or sections of the blanket assembly 160 can be attached to one or more of the cushions, using, for example, clips, hook and loop fasteners, zippers, snaps, or the like. The blanket assembly 160 may also function to retain one or more of the cushions in place overlying the corresponding support structure or framework of the seat system 102.

At least one of the cushions is designed and configured to change shape and/or contour in response to changes in the seat position. More specifically, adjustment of the seat system 102 into different positions is associated with changes to the configuration, arrangement, orientation, and/or layout of underlying support structures, which alters the shape and/or contour of the cushion(s). In accordance with the embodiment described here, the back rest cushion 152 and the seat cushion 150 change shape in response to adjustment of the seat system 102 into different positions. It should be appreciated that the shape-changing characteristics may also be utilized with the leg cushion 154, the neck support component 126, and/or the ottoman component 106 if so desired.

Referring to FIG. 5 and FIG. 8, when the seat system 102 is in a flat position, the support structure of the seat cushion 150 is held in a flat state or configuration that causes the seat cushion 150 to assume a nominally flat shape that provides a relatively flat occupant-facing surface. Likewise, the support structure of the back rest cushion 152 is held in a flat state or configuration that causes the back rest cushion 152 to assume a nominally flat shape that provides a relatively flat occupant-facing surface. In a flat position, the blanket assembly 160 may be stretched and held under tension to help maintain the flat shape of the cushions.

Referring to FIG. 1 and FIG. 6, when the seat system 102 is in the upright position, the support structure of the seat cushion 150 is held in its upright state or configuration that causes at least a portion of the seat cushion 150 to have a convex shape that provides a contoured and slightly raised occupant-facing surface. Likewise, the support structure of the back rest cushion 152 is held in its upright state or configuration that causes at least a portion of the back rest cushion 152 to have a convex shape that provides a contoured and slightly protruding occupant-facing surface (for lower back support and/or lumbar support). The convex shapes of the seat cushion 150 and the back rest cushion 152 are more clearly visible in FIG. 6.

Referring to FIG. 3 and FIG. 7, when the seat system 102 is in a reclined position, the support structure of the seat cushion 150 is held in a reclined state or configuration that causes at least a portion of the seat cushion 150 to have a convex shape that provides a contoured and slightly raised occupant-facing surface. Likewise, the support structure of the back rest cushion 152 is held in a reclined state or configuration that causes at least a portion of the back rest cushion 152 to have a convex shape that provides a contoured and slightly protruding occupant-facing surface (for lower back support and/or lumbar support). The convex shapes of the seat cushion 150 and the back rest cushion 152 are more clearly visible in FIG. 7. Although not always required, the shape and contour of the back rest cushion 152 may change when transitioning between upright and reclined positions, and the shape and contour of the back rest cushion 152 in the upright position may be different as compared to a reclined position. Similarly, the shape and contour of the seat cushion 150 may change when transitioning between upright and reclined positions, and the shape and contour of the seat cushion 150 in the upright position may be different as compared to a reclined position.

In accordance with certain embodiments, the support structure for a shape-changing cushion has a variable physical configuration that changes in response to adjustment of the seating position of the seat system. The support structure directly or indirectly supports the shape-changing cushion in different modes that correspond to different seating positions. The shape-shifting cushion reacts to changes in the physical configuration of the underlying support structure, such that the shape and/or contour of the seating surface adapts in the desired manner.

Figure 10:
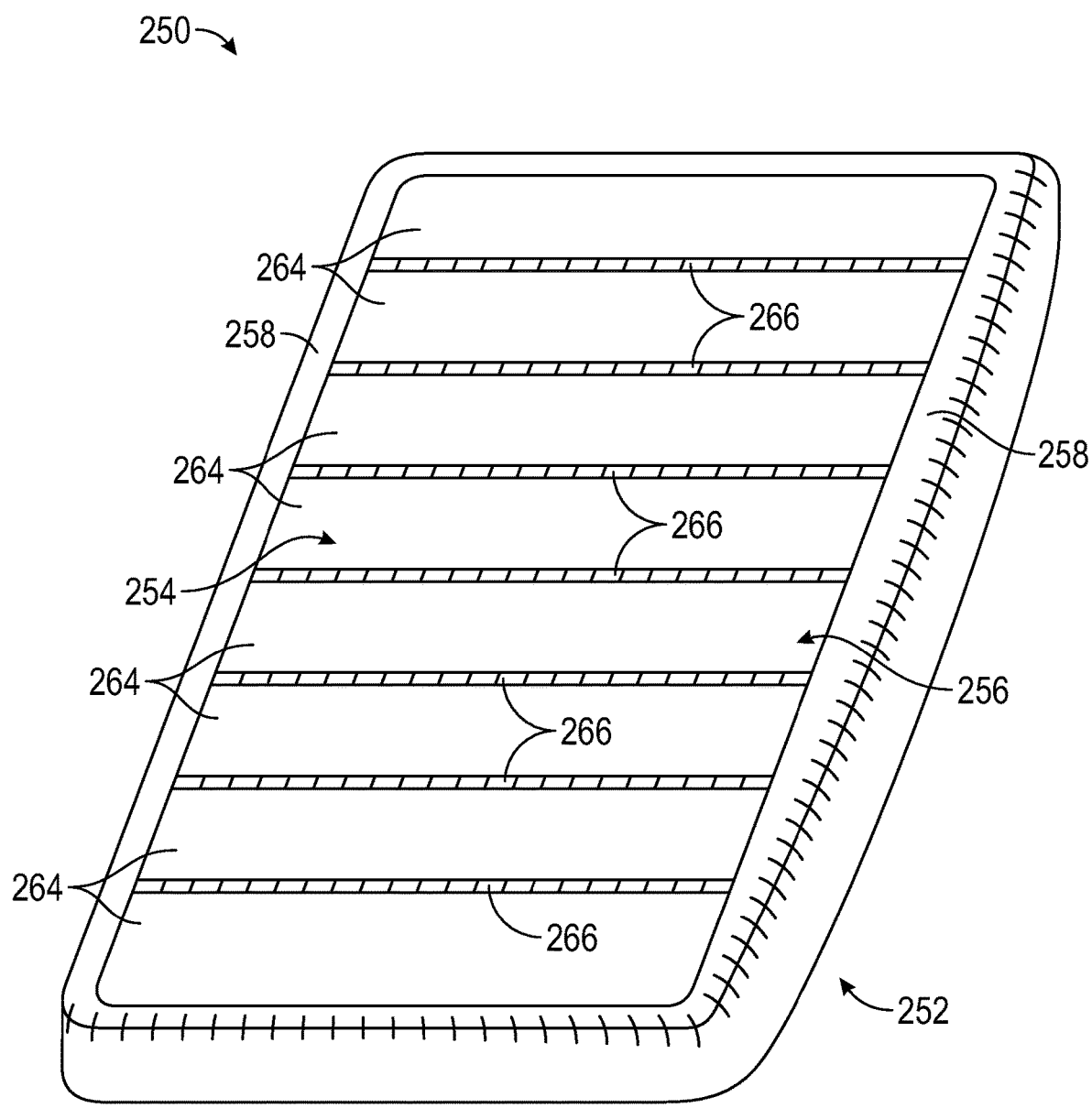
FIG. 10 is a bottom perspective view of an exemplary embodiment of an adaptive contour-shifting cushion suitable for use with an adjustable seat system of the type disclosed herein.
Figure 11:
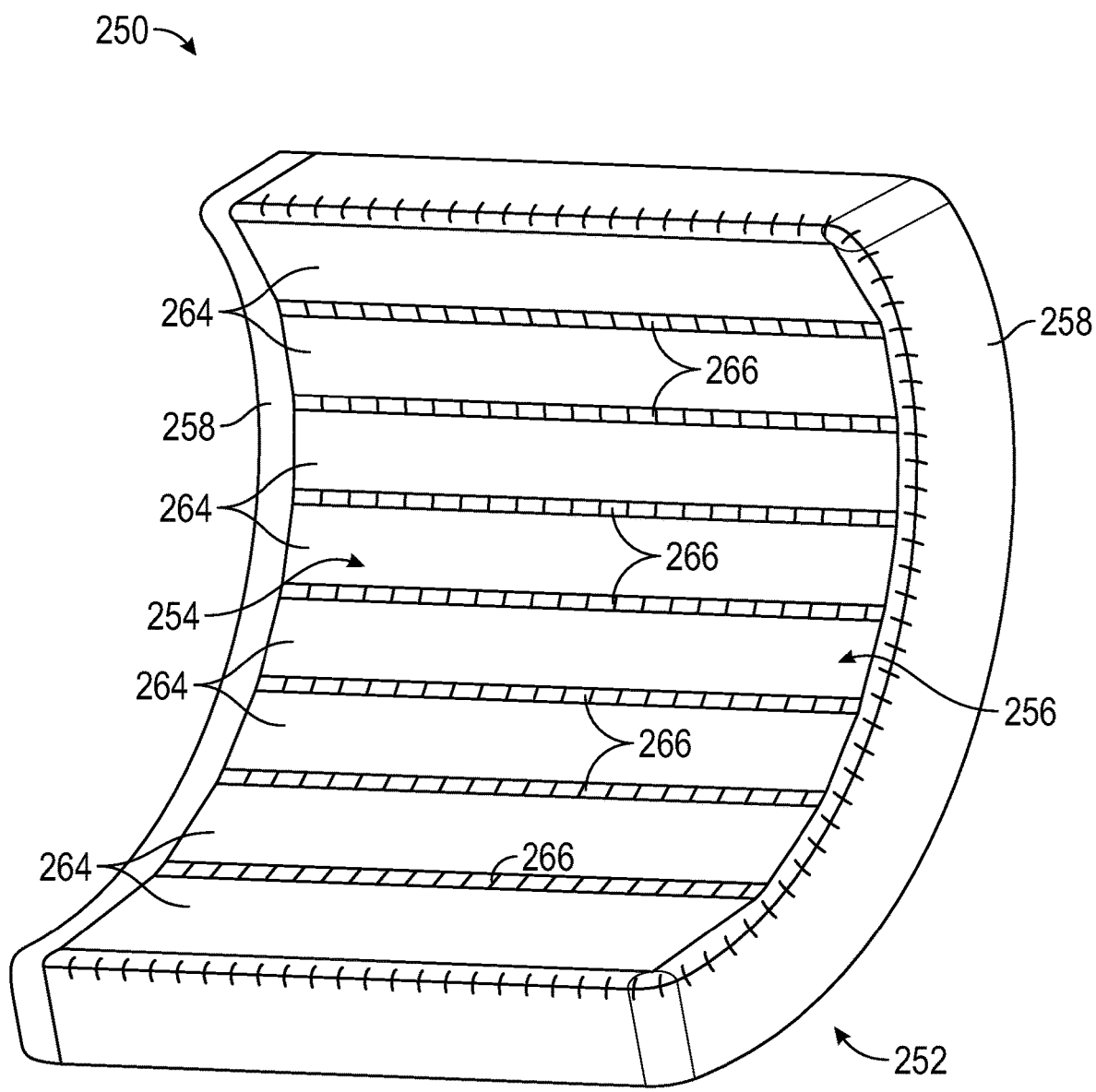
FIG. 11 is a bottom perspective view of the cushion shown in FIG. 10 in a curved or contoured configuration.

FIGS. 10 and 11 are bottom perspective views of an adaptive contour-shifting cushion 250 suitable for use with an adjustable seat system of the type disclosed herein. As mentioned above, at least the seat cushion 150 and the back rest cushion 152 can be implemented in a manner that is consistent with that described herein for the cushion 250. FIG. 10 depicts the cushion 250 in a nominally flat state, and FIG. 11 depicts the cushion 250 in a curved or contoured state. The curvature of the cushion 250 is exaggerated in FIG. 11 for clarity and ease of description.

The cushion 250 generally includes, without limitation: an occupant-facing surface 252; a bottom surface 254 that opposes the occupant-facing surface 252; cushioning material (hidden from view in FIGS. 10 and 11); an articulating arrangement of cushion support members 256; and a cover 258 overlying and enclosing the cushioning material. In FIGS. 10 and 11, most of the surface 252 is hidden from view because the surface 252 defines the top surface of the cushion 250 and FIGS. 10 and 11 show the bottom of the cushion 250. For this particular embodiment, the arrangement of cushion support members 256 combine to define the bottom surface 254. In this regard, the cushion support members 256 are movably coupled together to create a dynamically adjustable and movable bottom surface 254 of the cushion 250.

The cushioning material may be applied to, molded around, affixed to, or otherwise carried by the arrangement of cushion support members 256. The cover 258 may be fabricated from any suitable material, and it may be realized as a one-piece component or constructed from a plurality of sections, panels, or pieces. The cover 258 is installed overlying the cushioning material. At least a portion of the cover 258 can be affixed to the arrangement of cushion support members 256 and/or to the cushioning material. In accordance with the illustrated embodiment, the cover 258 overlaps the sidewalls of the cushioning material and overlaps at least a portion of the arrangement of cushion support members 256. The edge portion of the cover 258 can be affixed or adhered to the arrangement of cushion support members 256 in any suitable manner. For example, the cover 258 can be glued or bonded to the arrangement of cushion support members 256. Alternatively or additionally, the cover 258 can be attached to the arrangement of cushion support members 256 using snaps, hook-and-loop fasteners, clips, screws or bolts, buttons, or any type of fastening system.

Figure 15:
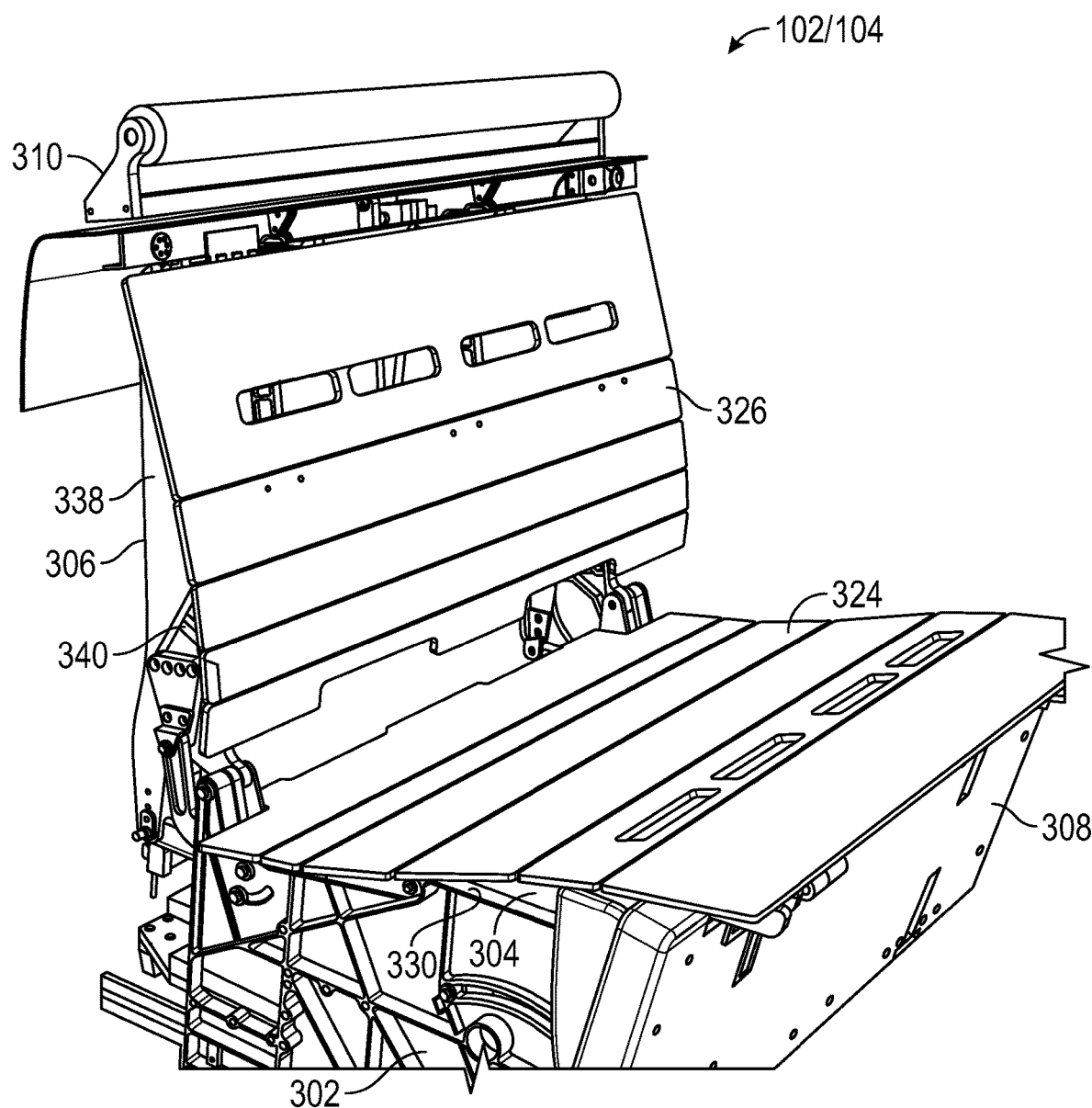
FIG. 15 is another exterior side perspective view that depicts support structures, frame elements, and linking components of an adjustable seat system of the type disclosed herein.
Figure 20:
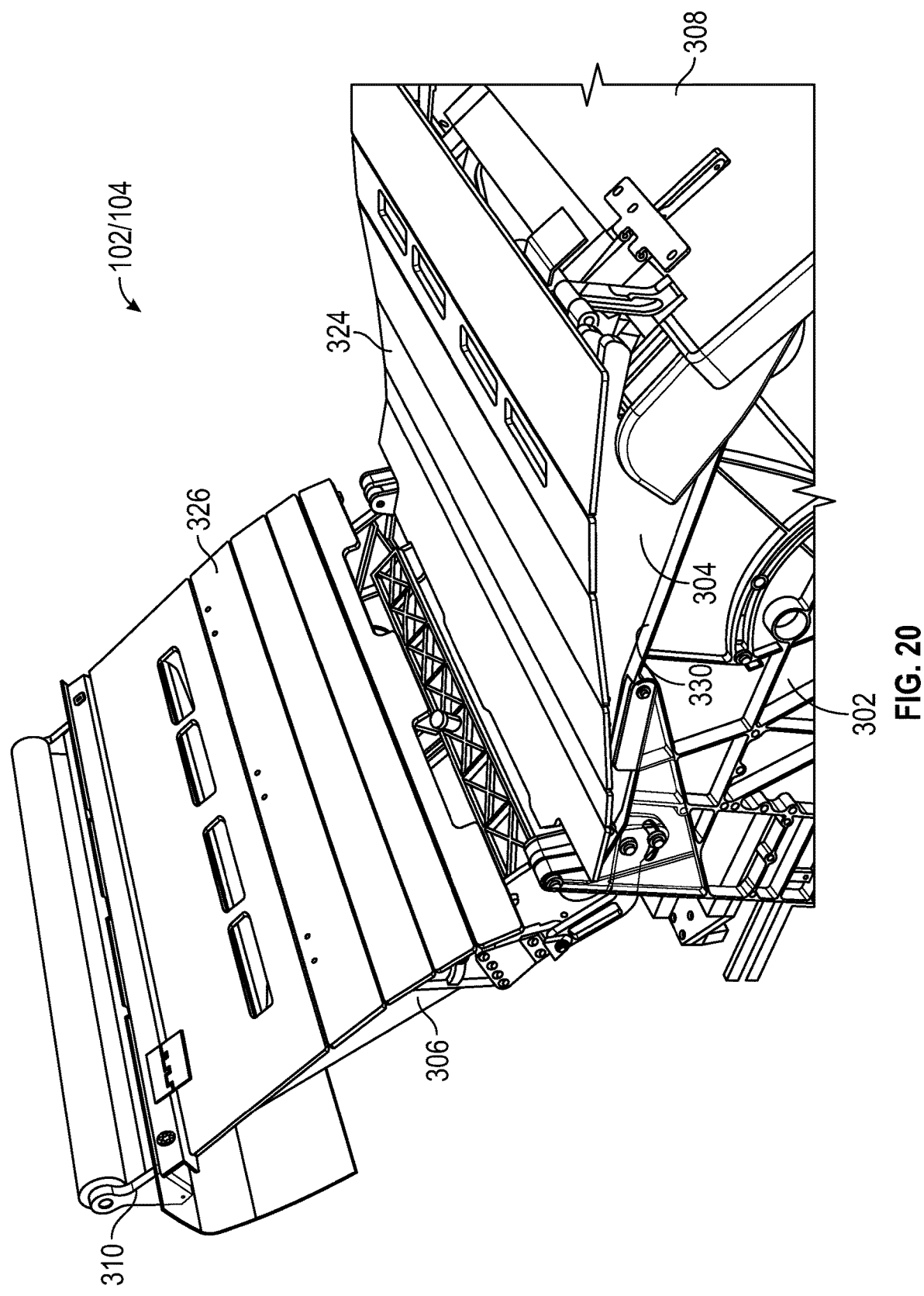
FIG. 20 is another exterior side perspective view that depicts support structures, frame elements, and linking components of an adjustable seat system of the type disclosed herein.
Figure 21:
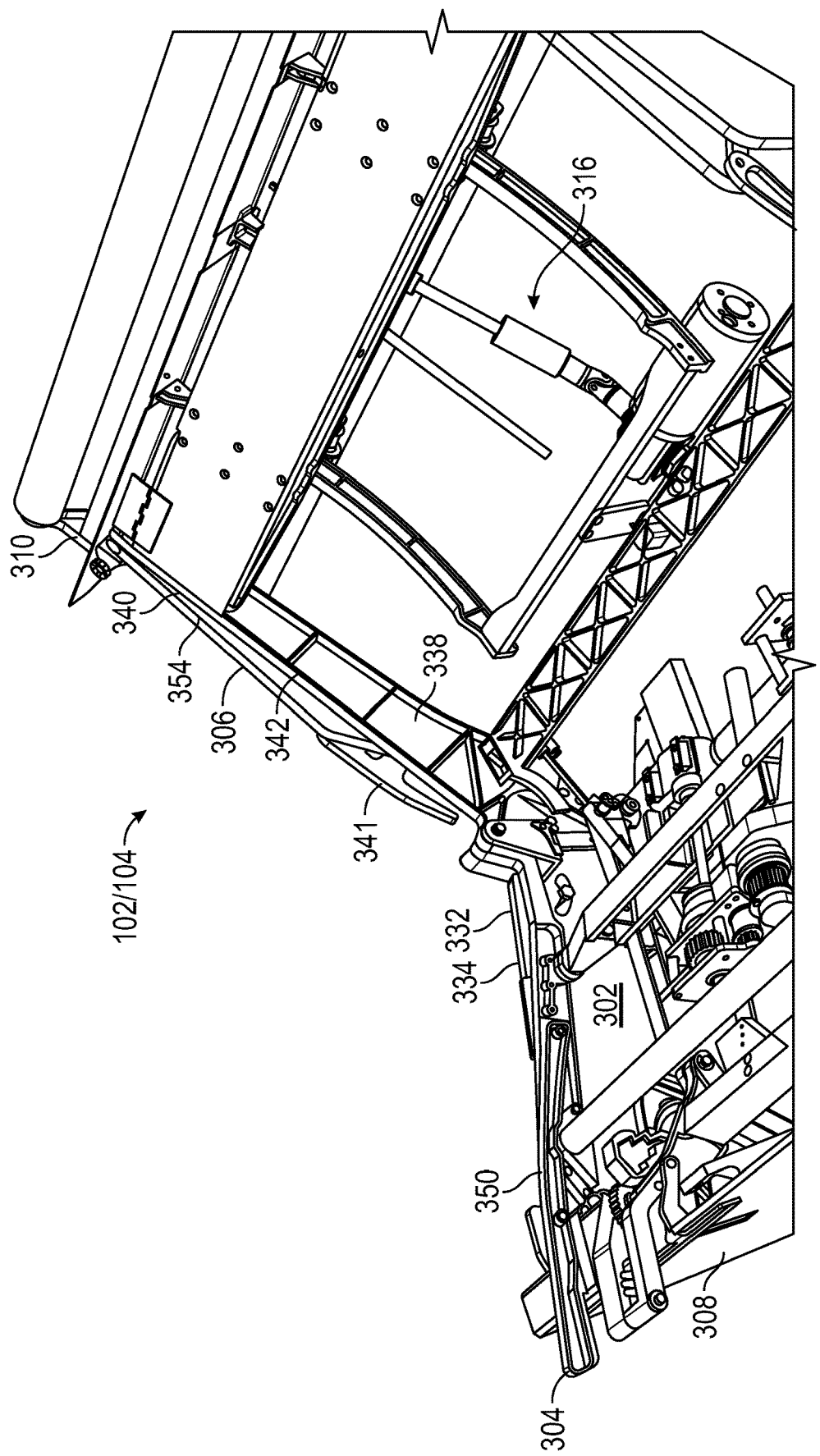
FIG. 21 is an interior side perspective view that depicts support structures, frame elements, and linking components of an adjustable seat system of the type disclosed herein.

In certain embodiments, the arrangement of cushion support members 256 includes a plurality of rigid plates 264 (which may be flat or contoured) that are coupled together via hinged joints 266. The plates 264 are preferably fabricated from a strong, lightweight, and stiff material (or combination of materials) including, without limitation: aluminum, steel, plastic, and a composite material. The illustrated embodiment includes eight rectangular plates 264 that are horizontally oriented and movably coupled together via horizontally oriented hinged joints 266. As shown in FIG. 10, the hinged joints 266 are arranged in parallel relative to one another. In alternative embodiments, the arrangement of cushion support members 256 can include more or less than eight plates 264, the plates 264 need not be rectangular or regular in shape, the plates 264 need not be the same shape or size, and movement of the plates 264 need not be restricted to any particular direction or dimension (see, for example, FIGS. 15, 20, and 25, which depict exemplary arrangements of such rigid plates). In alternative embodiments, the plates 264 can be movably coupled together using components or features other than hinges.

The overall shape and contour of the cushion 250 changes in response to movement of the arrangement of cushion support members 256. In this regard, FIG. 11 depicts a curved state of the cushion 250, wherein the plates 264 are no longer arranged in a flat and coplanar orientation. Instead, neighboring plates 264 are angled relative to each other due to pivoting about the respective hinged joint 266. Curvature of the arrangement of cushion support members 256 results in corresponding curvature of the cushioning material, the cover 258, and the occupant-facing surface 252. When the arrangement of cushion support members 256 is positioned as shown in FIG. 11 (resulting in a concave bottom surface 254), at least a portion of the cushion 250 bulges such that the occupant-facing surface 252 exhibits a convex side profile shape. In contrast, when the arrangement of cushion support members 256 is positioned as shown in FIG. 10 (resulting in a relatively flat and planar bottom surface 254), the occupant-facing surface 252 exhibits a nominally flat side profile shape. In other words, the cushion 250 no longer has any significant or obviously noticeable bulges or protrusions on the occupant-facing surface 252.

The arrangement of cushion support members 256 moves in concert with underlying support structures of the seat system 102, 104. In certain embodiments, the arrangement of cushion support members 256 is coupled to at least one movable support structure of the seat system 102, 104 using fasteners, adhesive, or another means of attachment. In other embodiments, the arrangement of cushion support members 256 is firmly held against at least one movable support structure of the seat system 102, 104 (without using fasteners, adhesive, or another means of attachment). In other embodiments, the arrangement of cushion support members 256 is coupled to or integrated with support structure of the seat system 102, 104 (rather than being integrated with the cushion 250), and the cushion 250 rests upon or is coupled to the arrangement of cushion support members 256.

Figure 18:
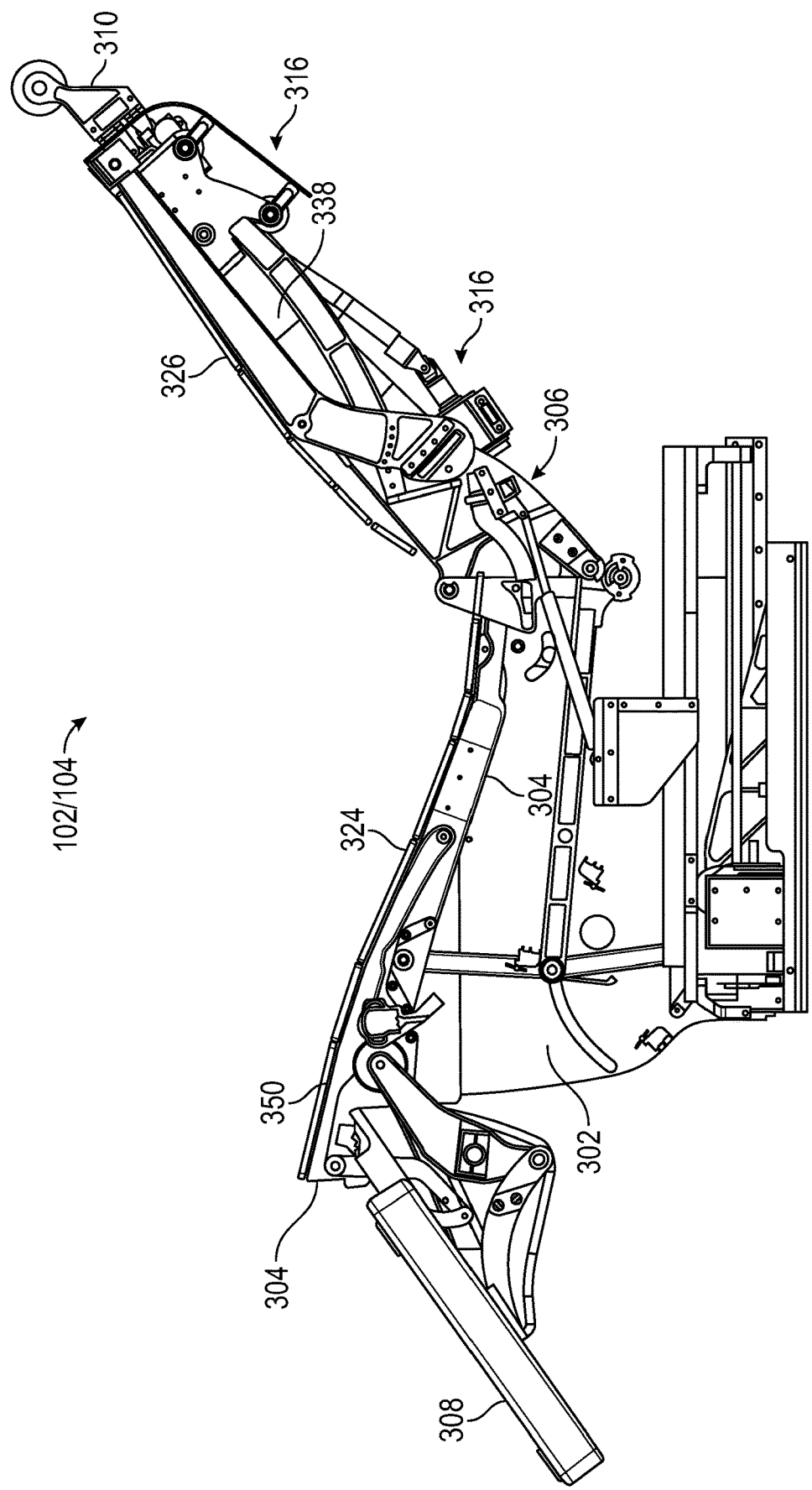
FIG. 18 is an interior side view that depicts support structures, frame elements, and linking components of an adjustable seat system of the type disclosed herein.
Figure 22:
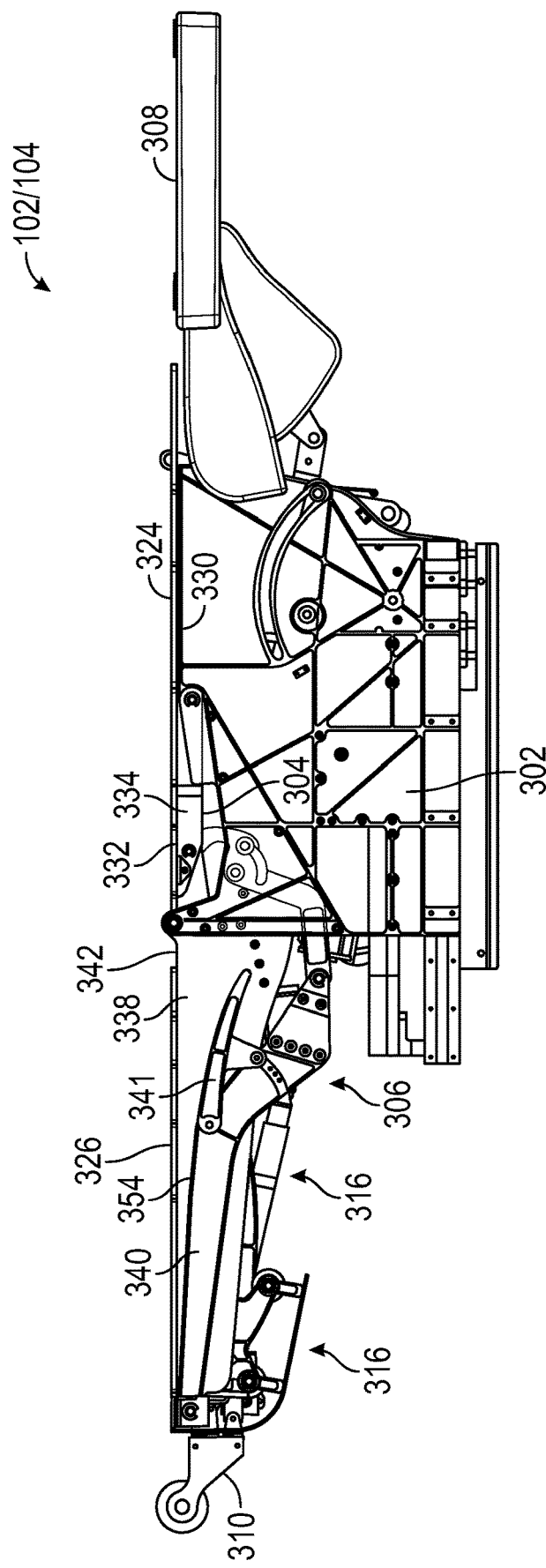
FIG. 22 is an exterior side view that depicts support structures, frame elements, and linking components of an adjustable seat system of the type disclosed herein.
Figure 23:
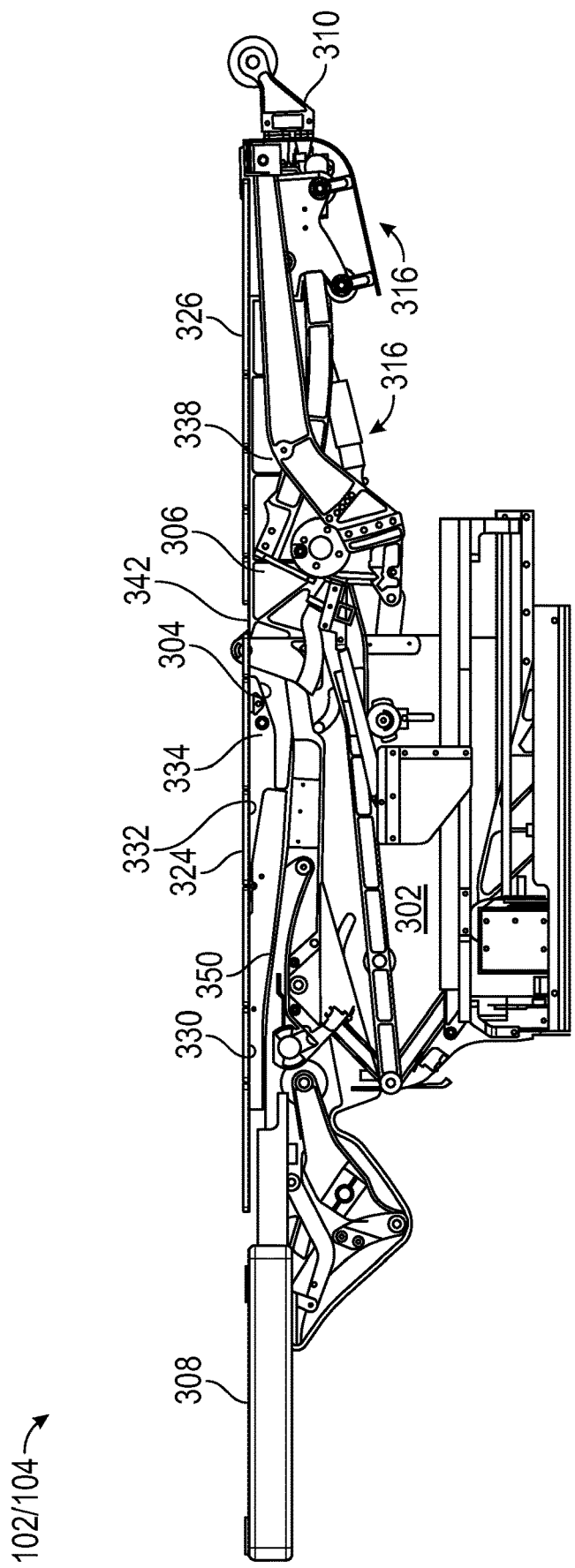
FIG. 23 is an interior side view that depicts support structures, frame elements, and linking components of an adjustable seat system of the type disclosed herein.

Internal components and support structures of the seat system 102, 104 will now be described with reference to FIGS. 12-31, which depict support structures, frame elements, and linking components of an adjustable seat system 102, 104 of the type disclosed herein. FIGS. 12-16 and 27-31 correspond to the upright position of the adjustable seat system 102, 104; FIGS. 17-21 correspond to a reclined position of the adjustable seat system 102, 104; and FIGS. 22-26 correspond to a flat position of the adjustable seat system 102, 104. FIGS. 12-31 show the internal mechanisms, hardware, and support structure of the seat system 102, 104 without any cushions, trim, cover material, blanket, etc. FIGS. 12, 17, 22, and 27-31 are exterior side views. FIGS. 13, 18, 23 are interior side views (showing certain components as viewed from inside the adjustable seat system 102, 104) that correspond to the exterior side views of FIGS. 12, 17, and 22. FIGS. 14-16, 19-21, and 24-26 are perspective side views that show a portion of the seat system 102. For simplicity, clarity, and ease of illustration, some structural components are not depicted or are not fully depicted in FIGS. 12-31.

As depicted in FIGS. 12-31, certain embodiments of the seat system 102, 104 include the following components, without limitation: a base support structure 302; a seat pan support structure 304 movably coupled to the base support structure 302; a back rest support structure 306 movably coupled to the base support structure 302; a leg rest support structure 308 movably coupled to the base support structure 302; and a neck rest support structure 310 movably coupled to the base support structure 302. The seat pan support structure 304 and/or the base support structure 302 supports the seat cushion, the back rest support structure 306 supports the back rest cushion, the leg rest support structure 308 supports the leg cushion, and the neck rest support structure 310 supports or is integrated with the powered neck support component.

In accordance with the illustrated embodiment, the seat pan support structure 304 is movably coupled at or near the rearmost section of the base support structure 302, which enables the seat pan support structure 304 to tilt upward relative to the base support structure 302. In accordance with the illustrated embodiment, the back rest support structure 306 is also movably coupled at or near the rearmost section of the base support structure 302, which enables the back rest support structure 306 to recline backward relative to the base support structure 302. Although not always required, the seat pan support structure 304 and the back rest support structure 306 can be pivotably coupled to the base support structure 302 at a common hinge point. In accordance with the illustrated embodiment, the leg rest support structure 308 is indirectly coupled to the base support structure 302 via the seat pan support structure 304. For example, the leg rest support structure 308 may be pivotably coupled at or near the front section of the seat pan support structure 304, to enable the leg rest support structure 308 to extend and retract relative to the front of the seat pan support structure 304 and relative to the front section of the base support structure 302. In accordance with the illustrated embodiment, the neck rest support structure 310 is indirectly coupled to the base support structure 302 via the back rest support structure 306. For example, the neck rest support structure 310 may be integrated with or coupled at or near the top section of the back rest support structure 306 in a way that allows the neck rest support structure 310 to extend (see FIG. 2 and FIG. 7) and retract (see FIG. 1 and FIG. 6) as needed. In this regard, the seat system 102, 104 may include a suitably configured drive mechanism 316 that can be electronically controlled to actuate (e.g., deploy and store) the neck rest support structure 310 on demand or automatically as needed.

Figure 25:
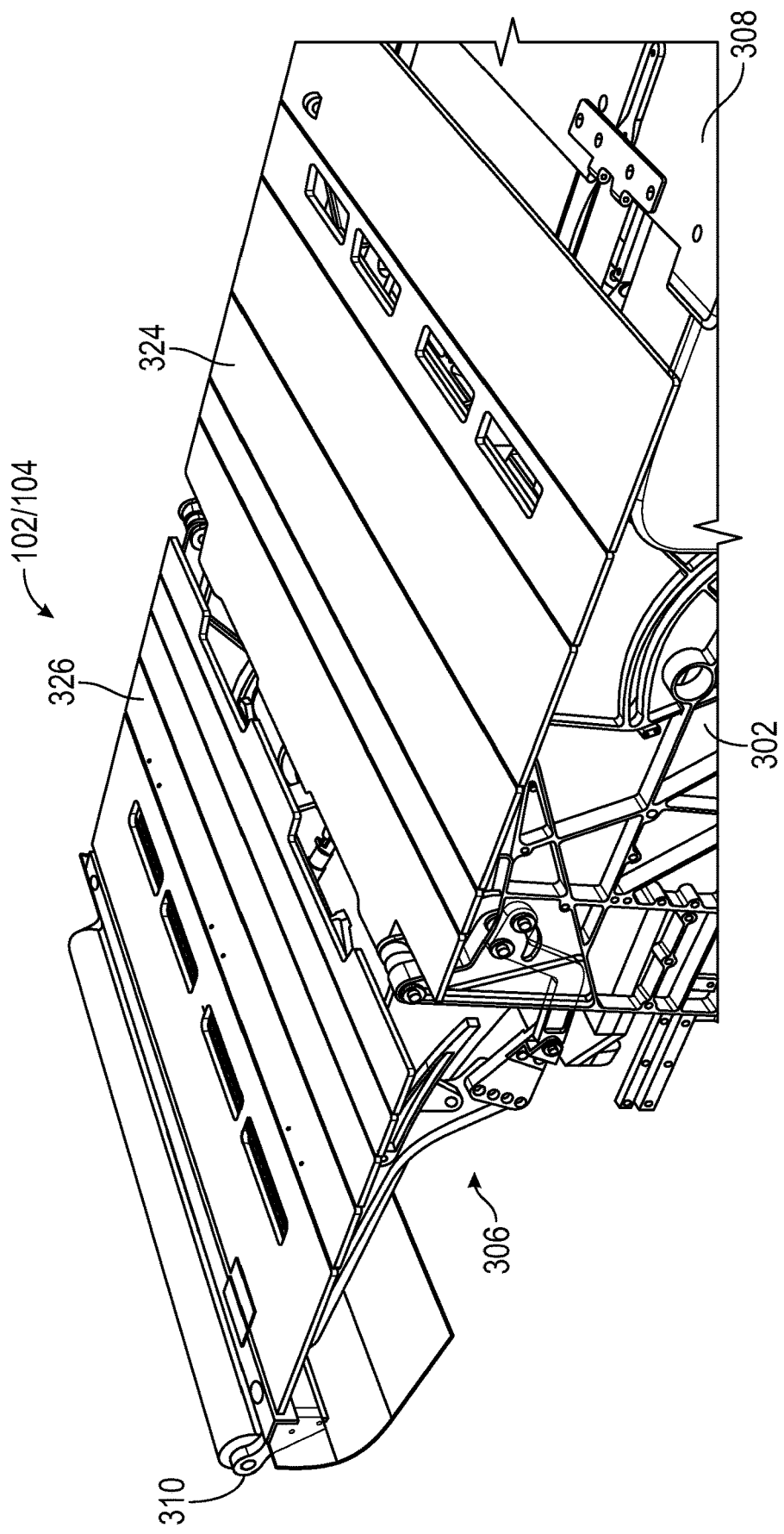
FIG. 25 is another exterior side perspective view that depicts support structures, frame elements, and linking components of an adjustable seat system of the type disclosed herein.
Figure 26:
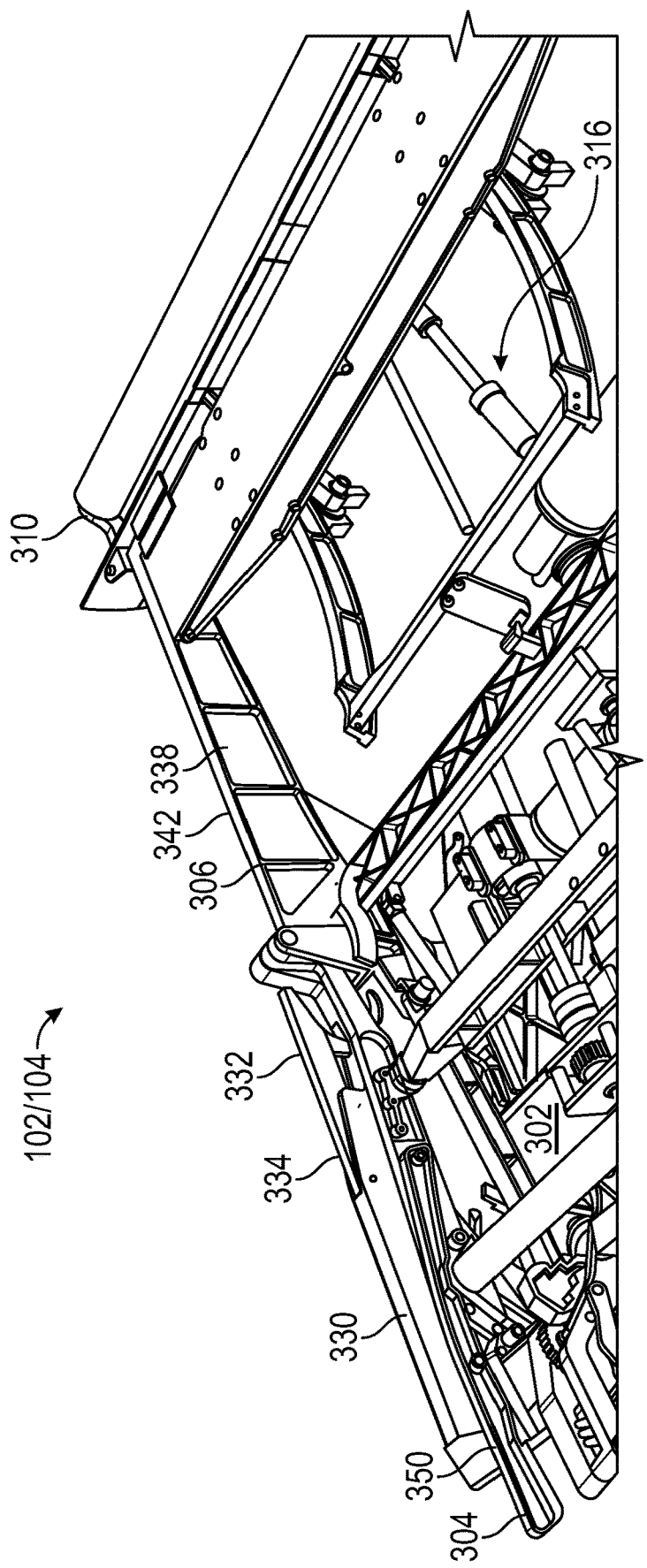
FIG. 26 is an interior side perspective view that depicts support structures, frame elements, and linking components of an adjustable seat system of the type disclosed herein.

FIGS. 12, 13, 15, 17, 18, 20, 22, 23, 25, and 27-31 depict an articulating arrangement of seat cushion support members 324 (without its associated seat cushion components) and an articulating arrangement of back rest cushion support members 326 (without its associated back rest cushion component). The arrangements of cushion support members 324, 326 are shown to demonstrate the manner in which they change shape and contour in response to adjustment of the seating position. More specifically, the arrangements of cushion support members 324, 326 follow the shape and contour of their underlying support structures, which change in concert with adjustment of the seating position (as explained above with reference to the arrangement of cushion support members 256 shown in FIGS. 10 and 11). Referring to FIGS. 22, 23, and 25, when the seat system 102, 104 is in a flat position, both arrangements of cushion support members 324, 326 are relatively flat and define a substantially planar surface. This is due to the relatively flat and/or relatively planar underlying support surfaces. In contrast, FIGS. 12, 13, 15, 17, 18, 20, and 27-31 correspond to various non-flat seat positions—the arrangements of cushion support members 324, 326 are no longer flat or planar because their underlying support surfaces have changed.

In certain embodiments, the base support structure 302 includes or defines at least one flat seat support surface 330, 332 that supports the seat cushion when the seat system 102, 104 is in the flat position. In the flat position, the articulating arrangement of seat cushion support members 324 physically adapts to comply with the at least one flat seat support surface 330, 332. The flat seat support surface 330 corresponds to a top surface of a left/right sidewall, a left/right frame, or a left/right rail of the base support structure 302. In accordance with the depicted embodiment, at least one flat seat support surface 330 resides at the left side of the seat system 102, 104, and at least one flat seat support surface 330 resides at the right side of the seat system 102, 104.

Figure 24:
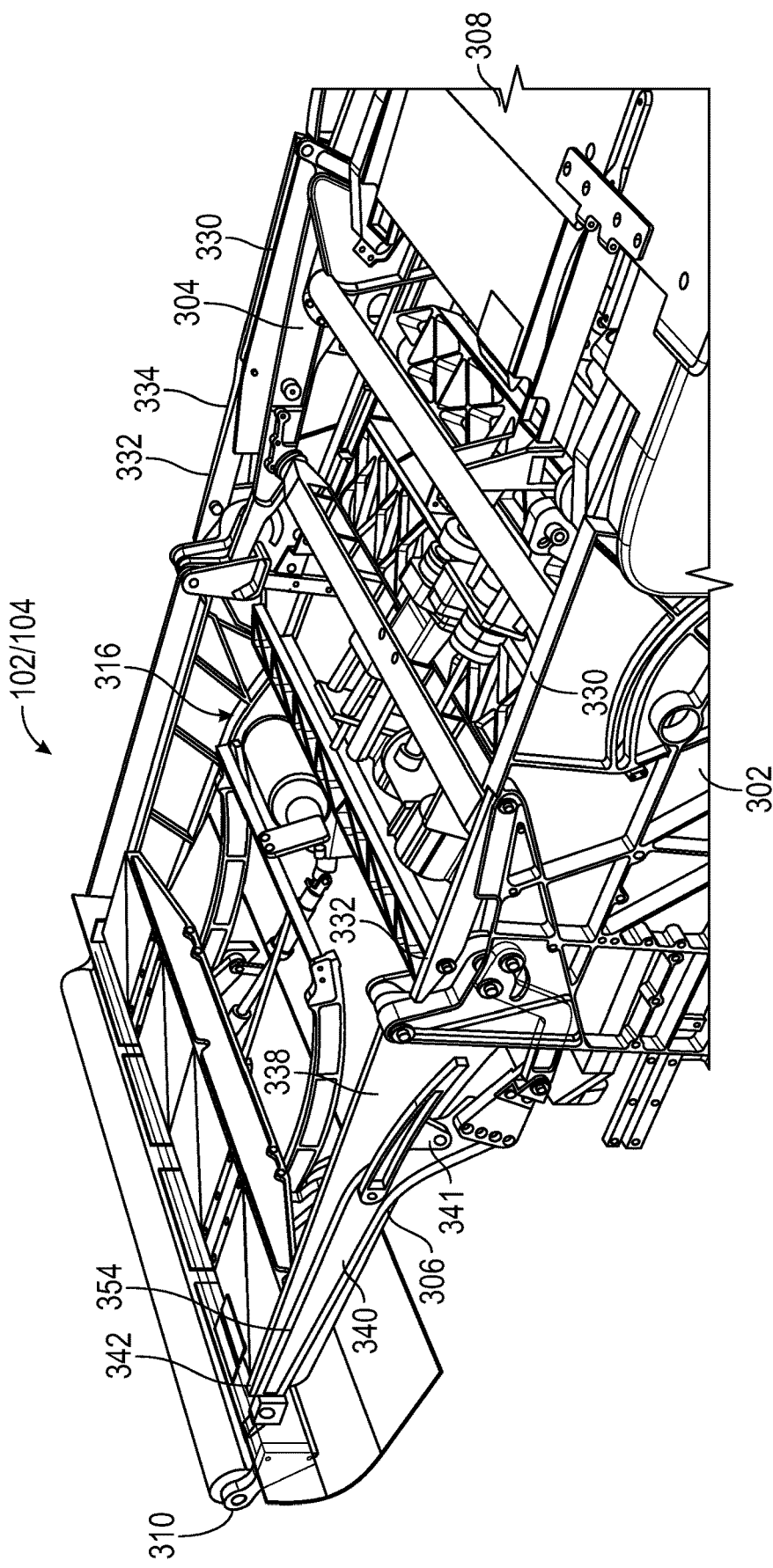
FIG. 24 is an exterior side perspective view that depicts support structures, frame elements, and linking components of an adjustable seat system of the type disclosed herein.

The flat seat support surface 330 is continuous with the bottom surface of the arrangement of seat cushion support members 324 in FIGS. 22, 23, and 25. The flat seat support surface 332 corresponds to a top surface of a movable left/right frame component 334. In accordance with the depicted embodiment, one movable frame component 334 resides at the left side of the seat system 102, 104, and another moveable frame component 334 resides at the right side of the seat system 102, 104. As shown in FIGS. 22-24, the flat seat support surface 332 may be continuous with the flat seat support surface 330. In accordance with the illustrated embodiment, each frame component 334 rotates about a horizontal axis located at or near the front end of the frame component 334. Thus, the frame components 334 tilt upward as the seat system 102, 104 transitions into the flat position to ultimately provide the flat seat support surface 332 for the arrangement of seat cushion support members 324. The frame components 334 tilt downward as the seat system 102, 104 transitions from the flat position, such that the top surfaces of the frame components 334 move away from, and out of contact with, the arrangement of seat cushion support members 324.

The back rest support structure 306 is configured and controlled to support the back rest cushion. In certain embodiments, the back rest support structure 306 includes a primary frame 338, an articulating frame 340 that is movably coupled to the primary frame 338, and a lumbar frame 341 that is movably coupled to the articulating frame 340. The primary frame 338 includes or defines at least one flat back support surface 342 (see FIGS. 16, 21-24, and 26) that supports the back rest cushion when the seat system 102, 104 is in the flat position. In the flat position, the articulating arrangement of back rest cushion support members 326 physically adapts to comply with the at least one flat back support surface 342. The flat back support surface 342 corresponds to a top surface of a left/right sidewall, a left/right section, or a left/right rail of the primary frame 338. In accordance with the depicted embodiment, at least one flat back support surface 342 resides at the left side of the seat system 102, 104, and at least one flat back support surface 342 resides at the right side of the seat system 102, 104. As explained in more detail below, the articulating frame 340 is positioned such that it does not contact the arrangement of back rest cushion support members 326 when the seat system 102, 104 is in the flat position. In this regard, the articulating frame 340 moves downward relative to the top surface of the primary frame 338 as the seat system 102, 104 transitions into the flat position, ultimately dropping below the primary frame 338 and out of contact with the arrangement of back rest cushion support members 326.

When the seat system 102, 104 is adjusted into the flat position (shown in FIGS. 22-26), at least a portion of the seat cushion 150 flattens onto at least one flat seat support surface 330, 332 such that the occupant-facing seat surface exhibits a nominally flat side profile shape. Likewise, when the seat system 102, 104 is adjusted into the flat position, at least a portion of the back rest cushion 152 flattens onto the at least one flat back support surface 342 such that the occupant-facing back rest surface of the back rest cushion 152 exhibits a nominally flat side profile shape.

FIGS. 12-16 illustrate the support structure of the seat system 102, 104 when in the upright position. In the upright position, the arrangements of cushion support members 324, 326 are contoured due to the corresponding curved characteristics of their underlying support surfaces. More specifically, the arrangement of seat cushion support members 324 is no longer supported exclusively by the flat seat support surfaces 330, 332, and the arrangement of back rest cushion support members 326 is no longer supported exclusively by the flat back support surfaces 342.

In certain embodiments, the seat pan support structure 304 includes or defines at least one contoured seat support surface 350 that supports the seat cushion when the seat system 102, 104 is in the upright position. In the upright position, the articulating arrangement of seat cushion support members 324 physically adapts to comply with the at least one contoured seat support surface 350. According to the illustrated embodiment, one contoured seat support surface 350 corresponds to a top surface of a left arm, a left frame, or a left rail of the seat pan support structure 304, and another contoured seat support surface 350 corresponds to a top surface of a right arm, a right frame, or a right rail of the seat pan support structure 304. In accordance with the depicted embodiment, at least one contoured seat support surface 350 resides at the left side of the seat system 102, 104, and at least one contoured seat support surface 350 resides at the right side of the seat system 102, 104. In certain embodiments, the contoured seat support surface 350 may be realized as one continuous upper edge surface that spans between the two ends of the seat pan support structure 304.

The curved side profile of the contoured seat support surface 350 is best shown in FIGS. 14, 16, 19, and 21. From left to right in FIG. 13, the side profile exhibits a convex section at or near the left side, an inflection point at or near the middle, and a concave section at or near the right side. The curvature of the contoured seat support surface 350 influences the curvature, contour, and shape of the articulating arrangement of seat cushion support members 324 when the seat system 102, 104 is in the upright position. The arrangement of seat cushion support members 324 also rests on the contoured seat support surface 350 when the seat system 102, 104 is in a reclined position. When the seat system 102, 104 is in the reclined position shown in FIGS. 17-21, however, the rear section of the arrangement of seat cushion support members 324 is no longer supported by the contoured seat support surface 350. Instead, the rear section of the arrangement of seat cushion support members 324 is supported by the flat seat support surface 332 of the movable left frame component 334.

In certain embodiments, the back rest support structure 306 includes an adjustable lumbar frame 341 that can be set into a desired configuration to accommodate the occupant. The lumbar frame 341 is best depicted in FIGS. 12, 14, 17, 19, 22, and 27-31. The lumbar frame 341 is adjustably coupled to the articulating frame 340 at an upper hinge or pivot point to enable the lumbar frame 341 to rotate (within certain limits) relative to the articulating frame 340. The articulating frame 340 and/or the lumbar frame 341 may (but need not) be configured and controlled to move relative to one another as the position of the seat system 102, 104 is adjusted. In accordance with certain embodiments, the position of the lumbar frame 341 relative to the articulating frame 340 can be adjusted (e.g., according to aircraft specifications, for passenger customization, to increase or decrease low back or lumbar support) and set during fabrication of the seat system 102, 104. In such embodiments, subsequent adjustment of the lumbar frame 341 relative to the articulating frame 340 may be inhibited due to lack of accessibility. Adjustment of the lumbar frame 341 is described in more detail below with reference to FIGS. 27-31.

Figure 12:
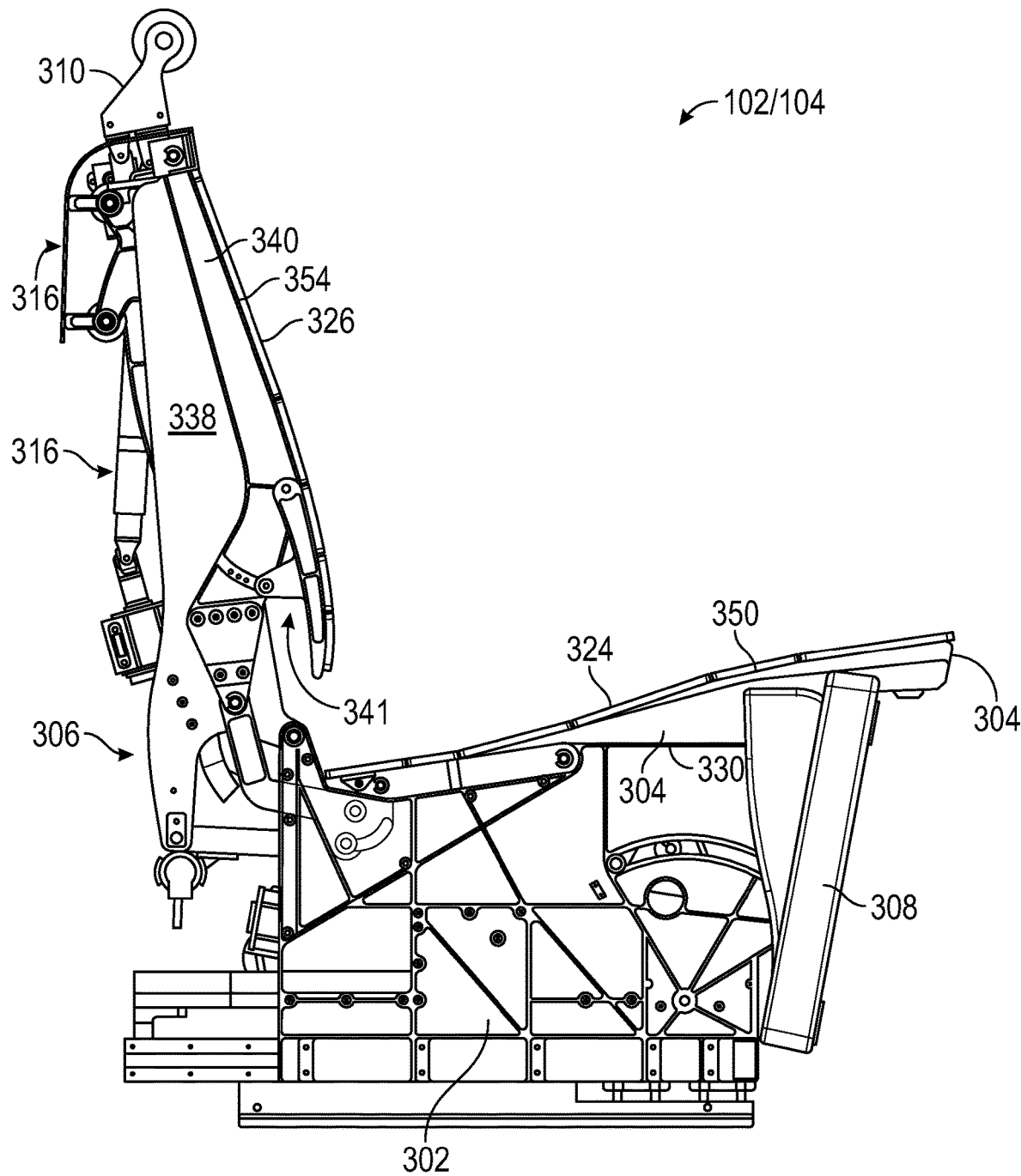
FIG. 12 is an exterior side view that depicts support structures, frame elements, and linking components of an adjustable seat system of the type disclosed herein.
Figure 13:
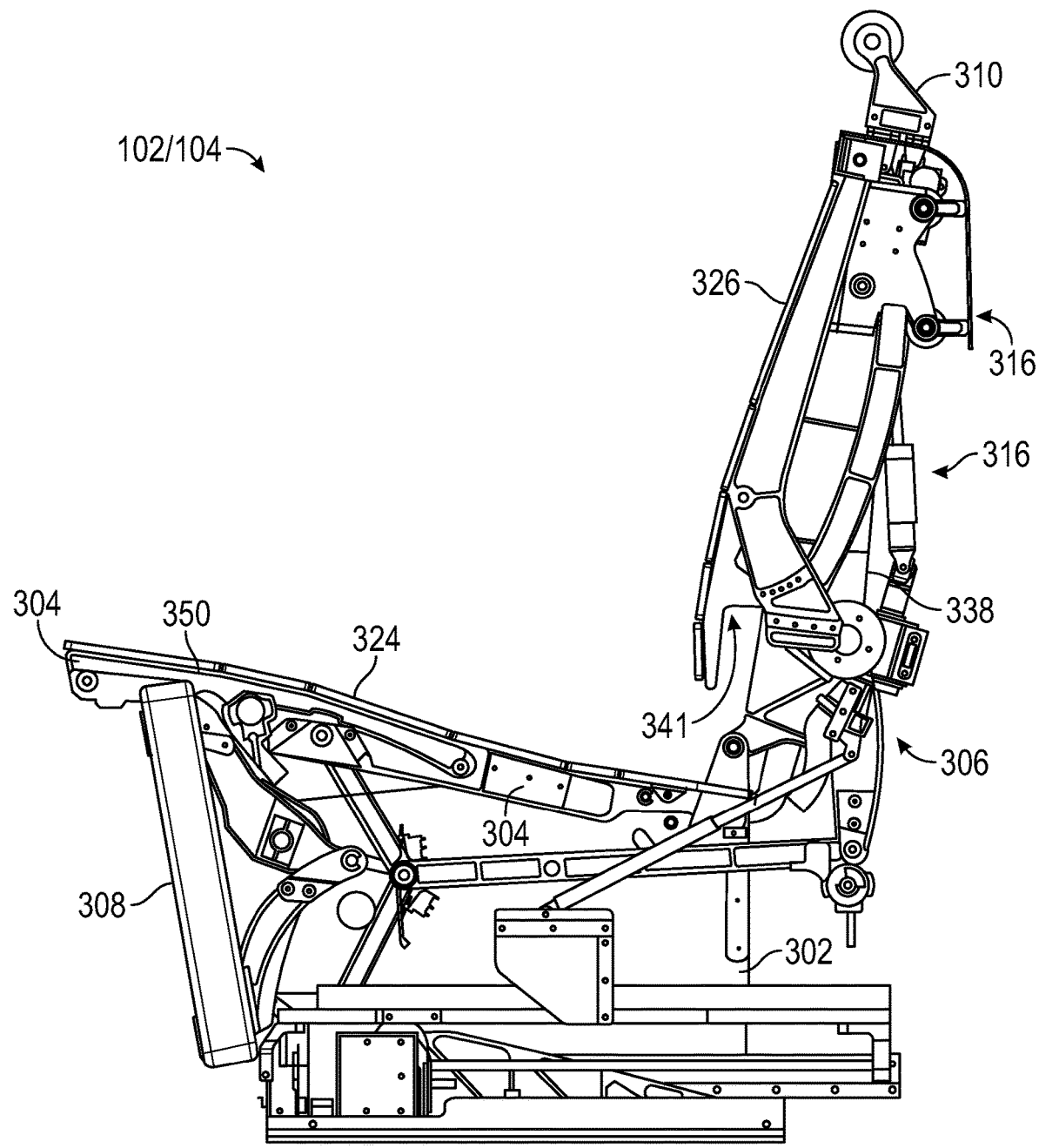
FIG. 13 is an interior side view that depicts support structures, frame elements, and linking components of an adjustable seat system of the type disclosed herein.
Figure 14:
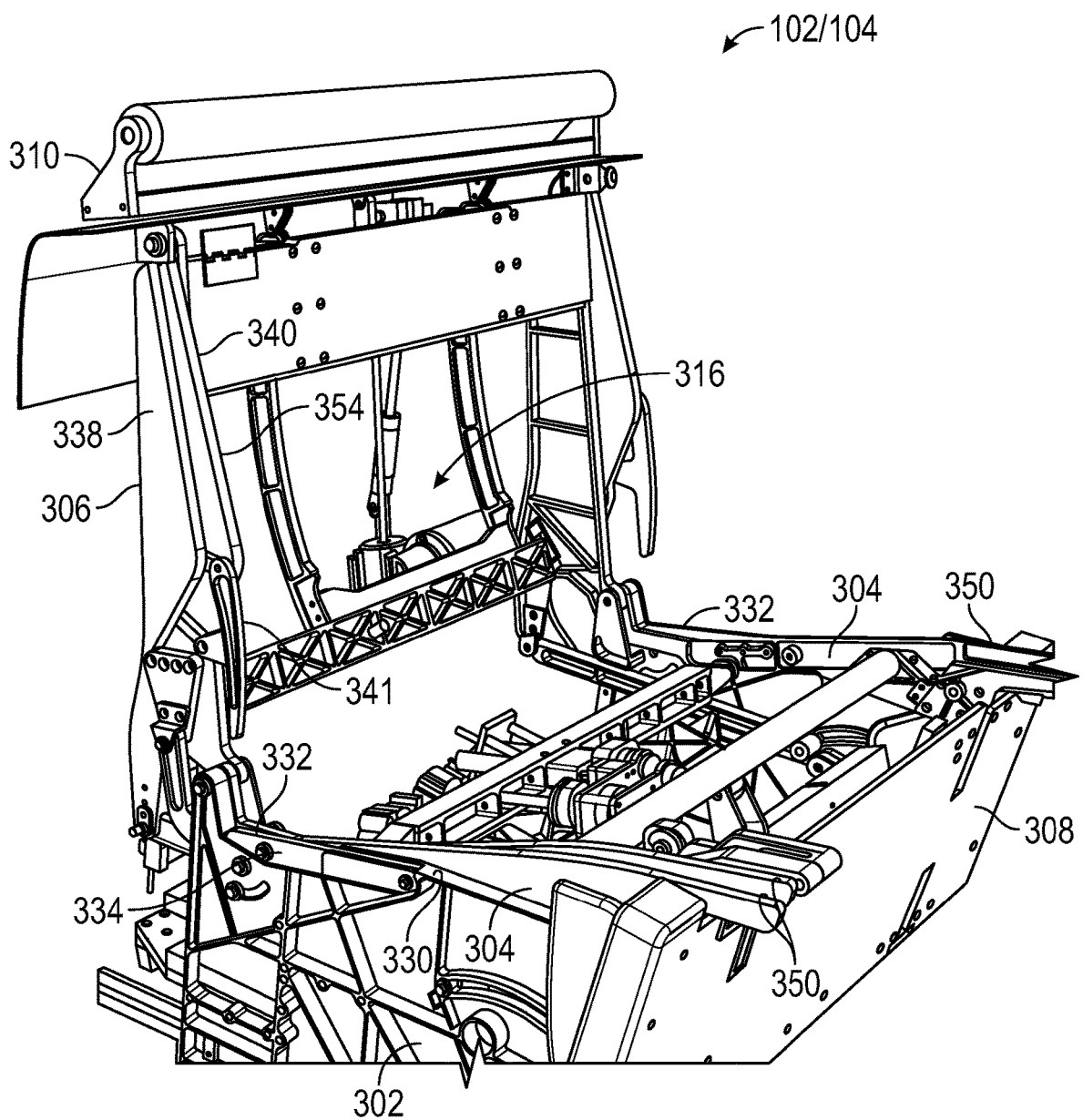
FIG. 14 is an exterior side perspective view that depicts support structures, frame elements, and linking components of an adjustable seat system of the type disclosed herein.
Figure 16:
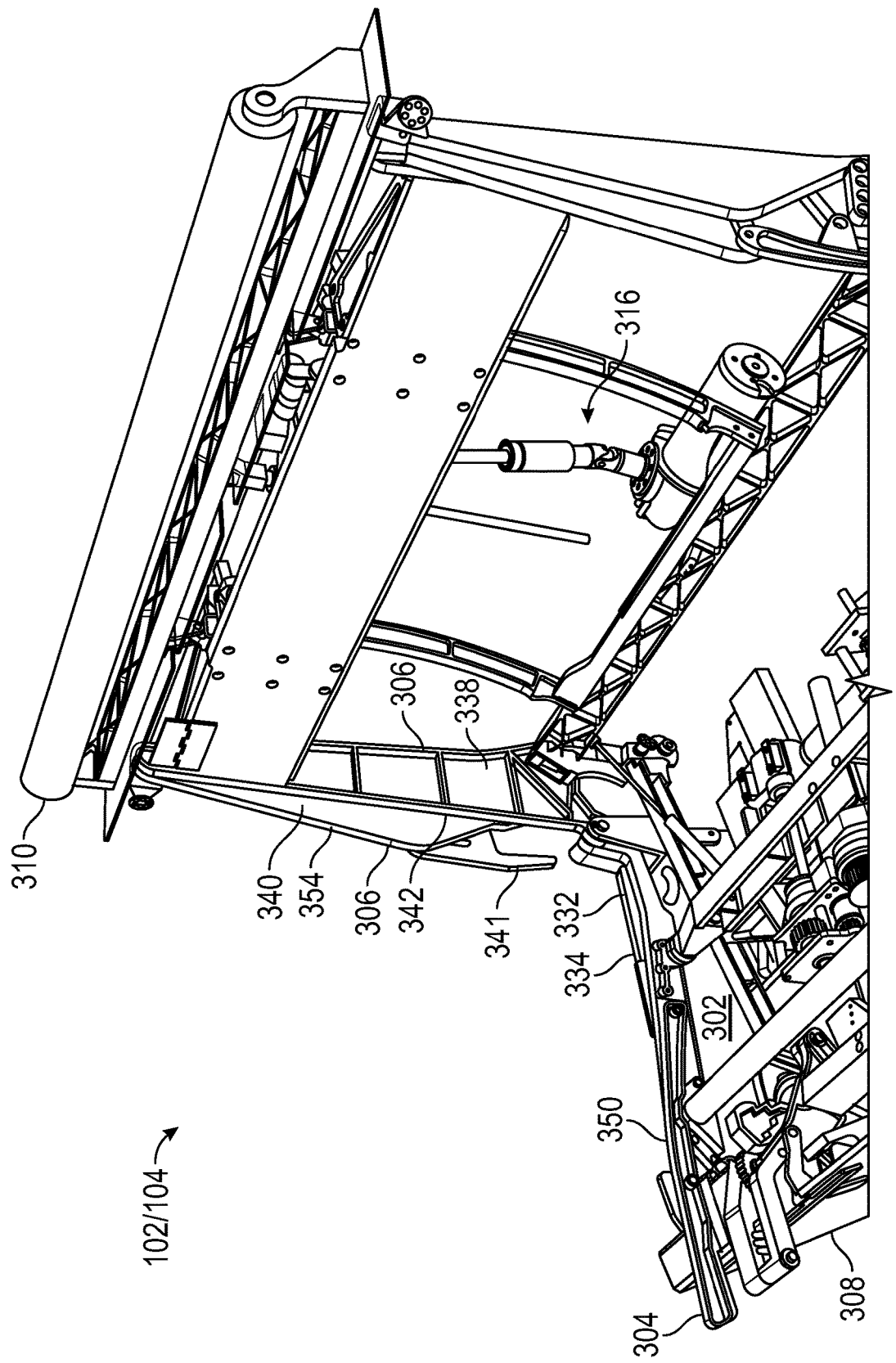
FIG. 16 is an interior side perspective view that depicts support structures, frame elements, and linking components of an adjustable seat system of the type disclosed herein.
Figure 17:
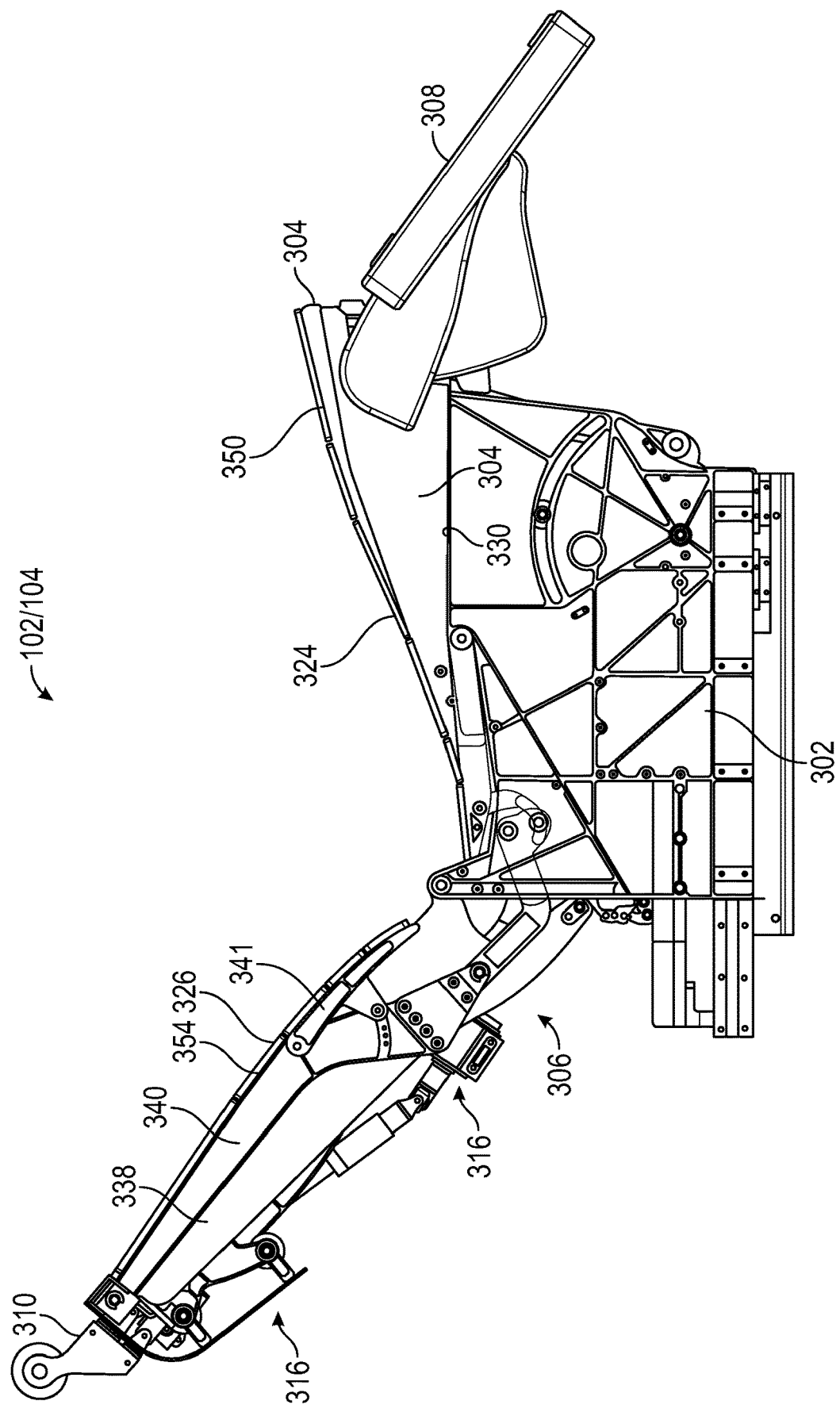
FIG. 17 is an exterior side view that depicts support structures, frame elements, and linking components of an adjustable seat system of the type disclosed herein.

In accordance with the illustrated embodiment, the articulating frame 340 (and the lumbar frame 341) includes or defines at least one contoured back support surface 354 that supports the back rest cushion when the seat system 102, 104 is in the upright position (see, for example, FIGS. 12, 14, and 16). In the upright position, the articulating arrangement of back rest cushion support members 326 physically adapts to comply with the at least one contoured back support surface 354. According to the illustrated embodiment, one contoured back support surface 354 corresponds to the top surface(s) of a left articulating frame 340 of the back rest support structure 306, and another contoured back support surface 354 corresponds to the top surface(s) of a left lumbar frame 341 of the back rest support structure 306. As shown in the figures, a contoured back support surface 354 may be realized as one continuous upper edge surface that spans between the two ends of the articulating frame 340. Other similarly configured contoured back support surface(s) 354 correspond to the top surface(s) of an opposing right articulating frame 340 and an opposing left lumbar frame 341 of the back rest support structure 306.

The curved side profile of the contoured back support surface 354 is shown better in the side views of FIGS. 12, 13, 17, 18, 22, and 27-31. The side profile resembles an airfoil that exhibits a more prominent convex section at or near the lower section of the articulating frame 340. The prominent convex section is designed and positioned to provide low back support for the occupant. As mentioned above, the lumbar frame 341 may be independently adjustable to vary the side profile shape of the contoured back support surface 354 (see FIGS. 27-31). The curvature of the contoured back support surface 354 influences the curvature, contour, and shape of the articulating arrangement of back rest cushion support members 326 when the seat system 102, 104 is in the upright position. The arrangement of back rest cushion support members 326 also rests on the contoured back support surface 354 when the seat system 102, 104 is in certain reclined positions, such as the reclined positions shown in FIGS. 17-21. As the seat system 102, 104 reclines further (to a flat position), however, the articulating frame 340 begins to retract below the primary frame 338. Consequently, in certain reclined positions, the arrangement of back rest cushion support members 326 is no longer supported exclusively by the contoured back support surface 354.

When the seat system 102, 104 is adjusted into the upright position, the at least one contoured seat support surface 350 causes a portion of the seat cushion 150 to bulge such that the occupant-facing seat surface exhibits a convex side profile shape. Likewise, when the seat system 102, 104 is adjusted into the upright position, the at least one contoured back support surface 354 causes at least a portion of the back rest cushion 152 to bulge such that the occupant-facing back rest surface of the back rest cushion 152 exhibits a convex side profile shape.

FIGS. 17-21 show the seat system 102, 104 in a reclined position, which resides between the upright position and the flat position. When the seat system 102, 104 is in this reclined position, the at least one contoured seat support surface 350 supports the seat cushion such that the articulating arrangement of seat cushion support members 324 physically adapts to comply with the at least one contoured seat support surface 350. In this regard, the seat cushion exhibits a non-flat and non-planar upper surface that follows the contour of the underlying support structures. Moreover, when the seat system 102, 104 is in this reclined position, the at least one contoured back support surface 354 supports the back rest cushion such that the articulating arrangement of back rest cushion support members 326 physically adapts to comply with the at least one contoured back support surface 354. Accordingly, the back rest cushion exhibits a non-flat and non-planar upper surface that follows the contour of the underlying support structures.

Figure 19:
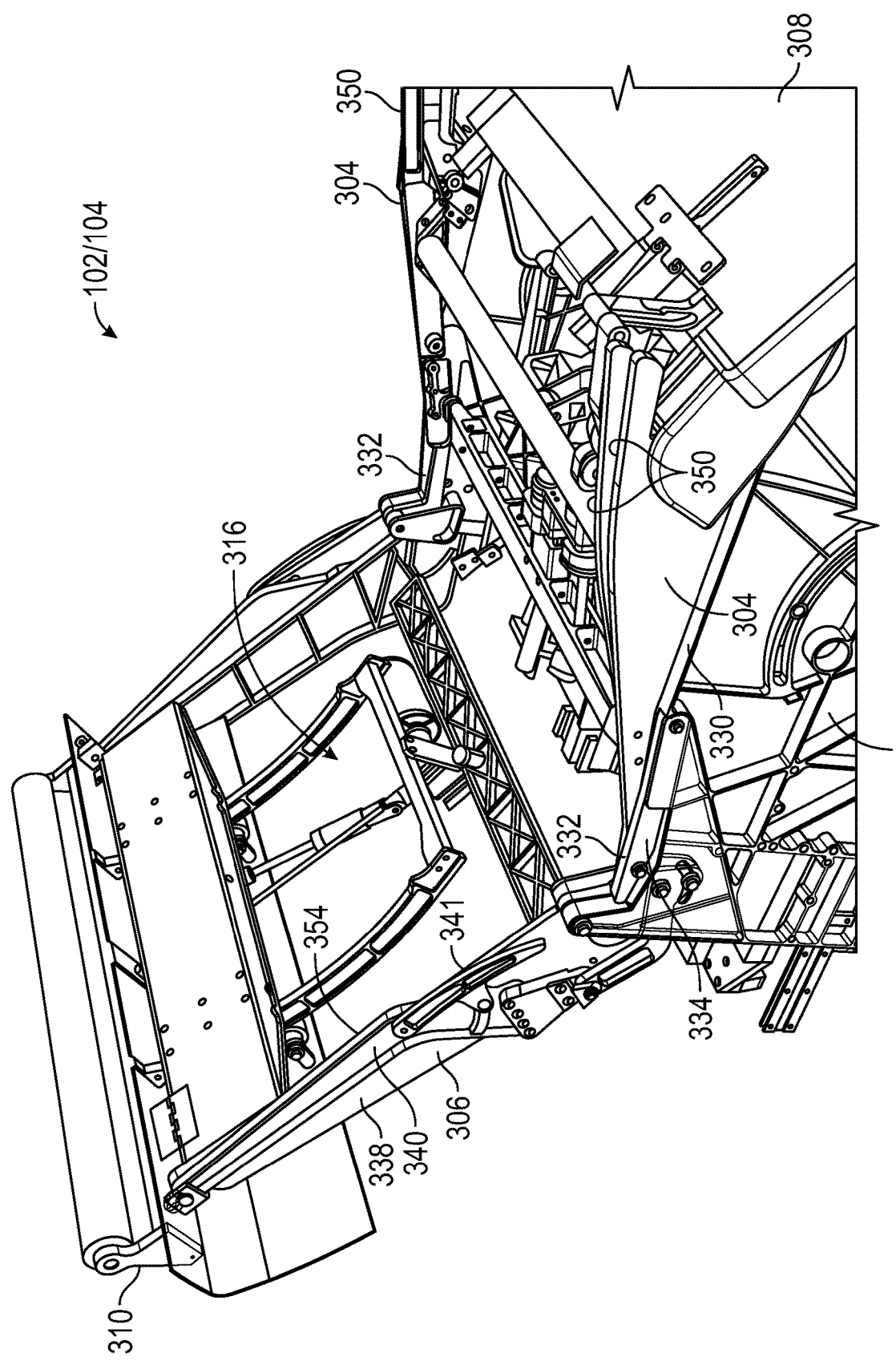
FIG. 19 is an exterior side perspective view that depicts support structures, frame elements, and linking components of an adjustable seat system of the type disclosed herein.
Figure 27:
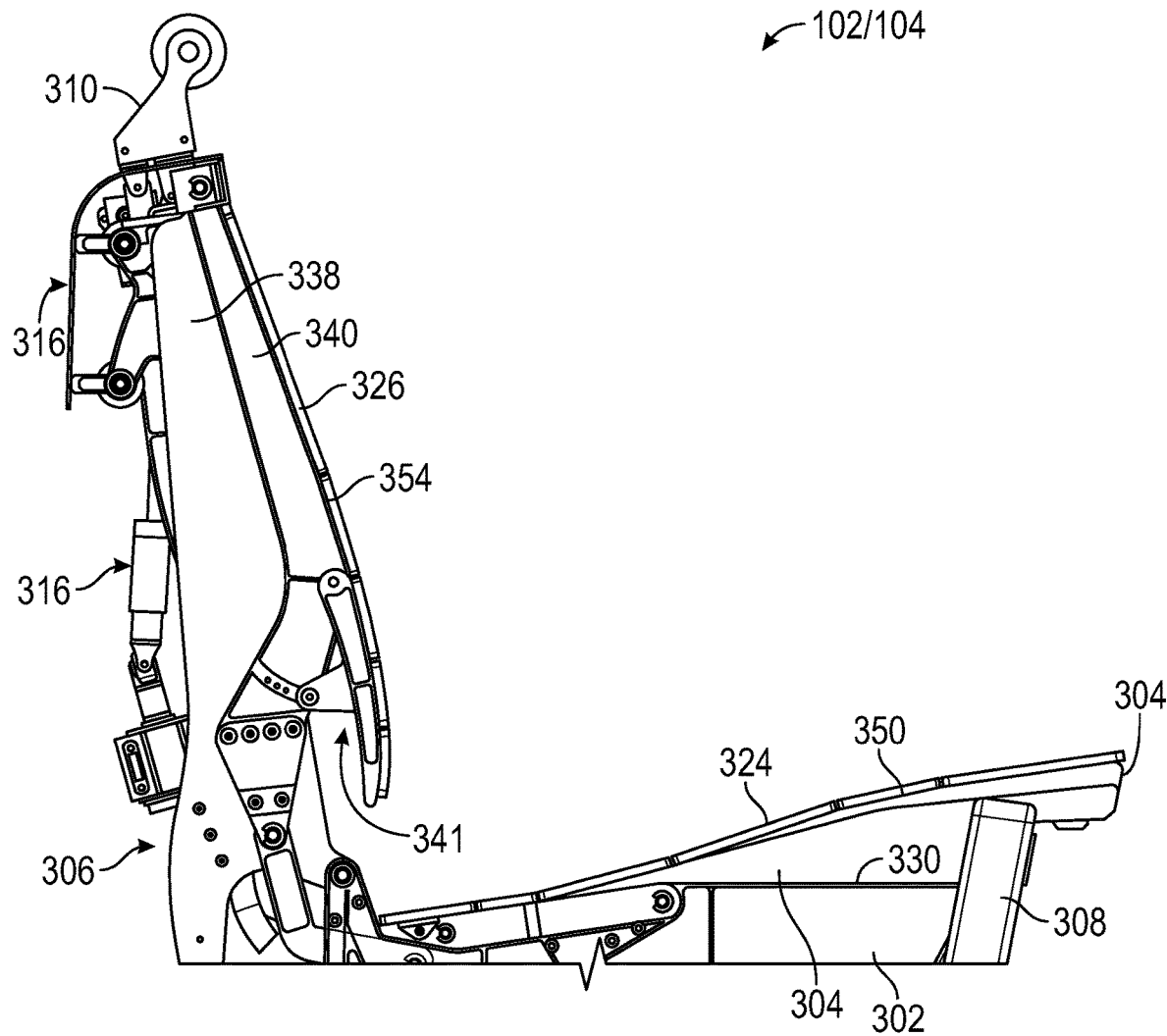
FIGS. 27-31 are exterior side views that depict support structures, frame elements, and linking components of an adjustable seat system of the type disclosed herein.
Figure 28:
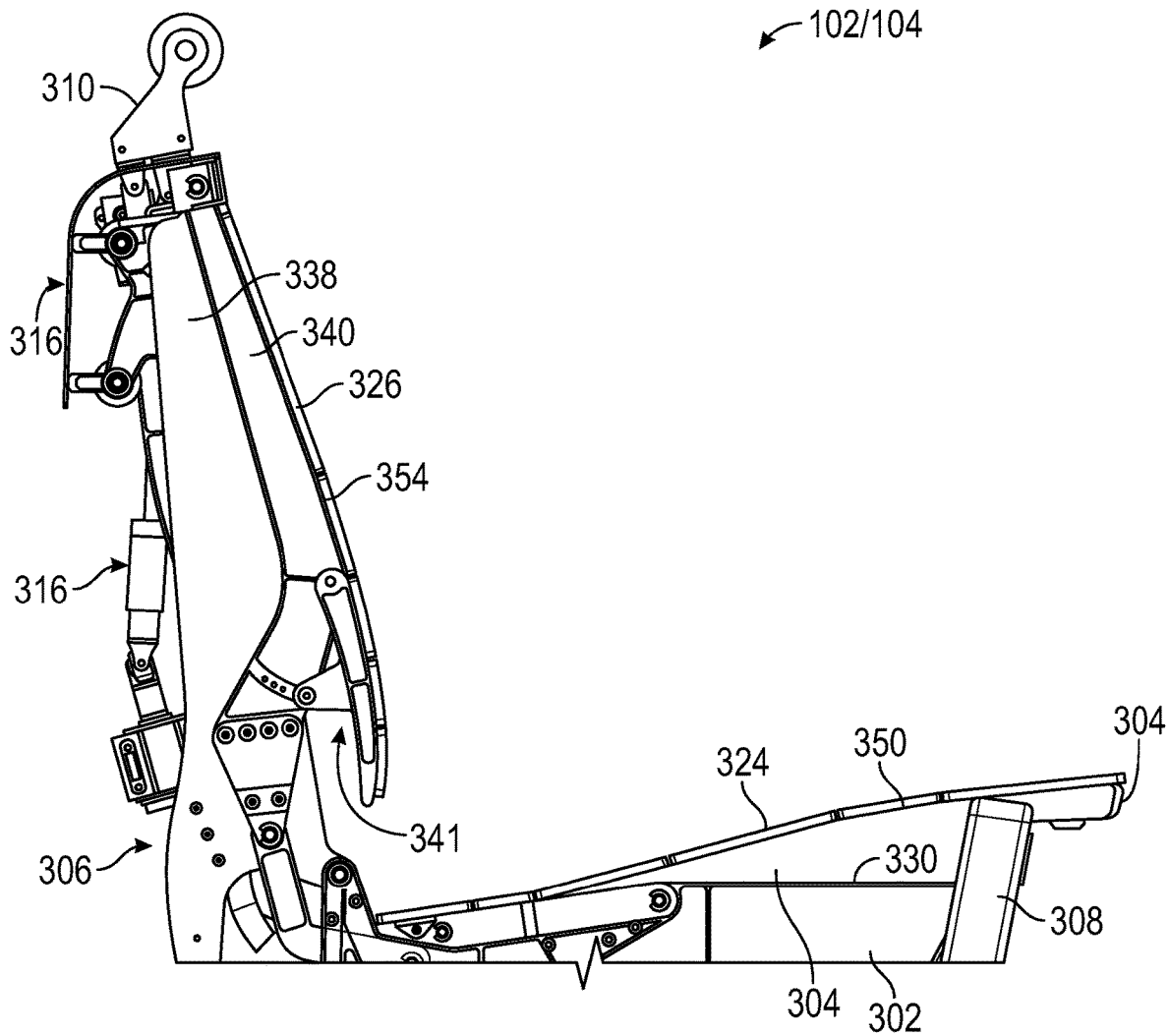

FIGS. 27 and 28 illustrate the adjustable nature of the seat pan support structure 304, which can be adjusted and set in a number of different positions to accommodate different occupants. More specifically, FIG. 27 shows the seat pan support structure 304 in a raised or lifted state, and FIG. 28 shows the seat pan support structure 304 in a lowered state. In certain embodiments, the seat pan support structure 304 accommodates more than two height settings. As shown in FIGS. 14, 19, the seat pan support structure 304 may include two adjacent rails on the right side and two adjacent rails on the left side (not completely shown). One or both of the adjacent rails can be raised or lowered as desired to adjust the height of the contoured seat support surface 350 that supports the articulating arrangement of seat cushion support members 324. In the illustrated embodiment, the outer rail is stationary and its upper surface supports the seat cushion support members 324 in the lowered state of the seat pan support structure 304. In contrast, the inner rail is movable and its upper surface supports the seat cushion support members 324 in the raised or lifted state of the seat pan support structure 304. To this end, the inner rail may be pivotable about an axis located near the back end of the inner rail. In accordance with certain embodiments, the position of the movable rail can be adjusted (e.g., according to aircraft specifications, for passenger customization, to increase or decrease thigh support) and set during fabrication or installation of the seat system 102, 104. In such embodiments, subsequent height adjustment of the seat pan support structure 304 may be inhibited due to lack of accessibility.

Figure 29:
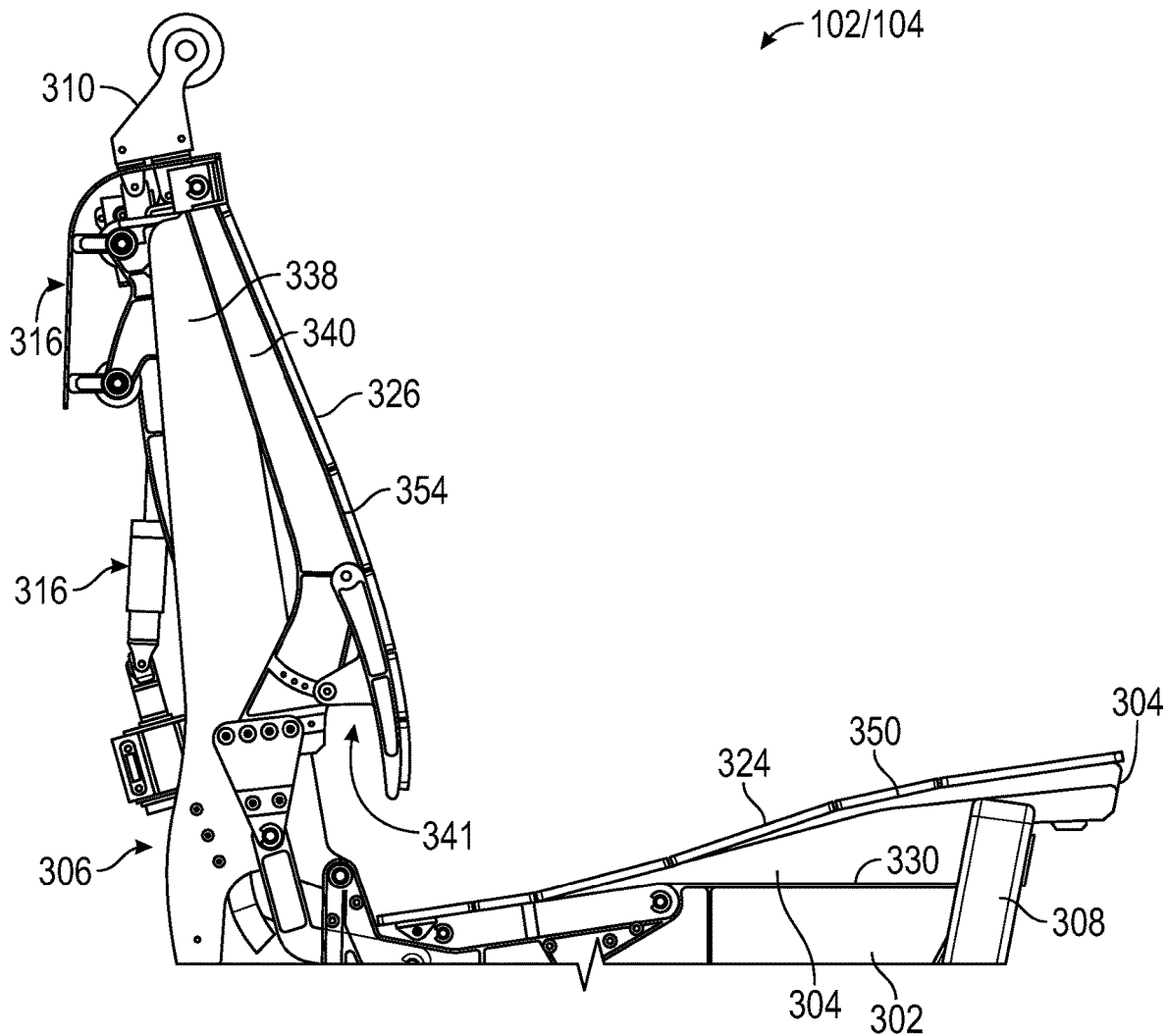
Figure 30:
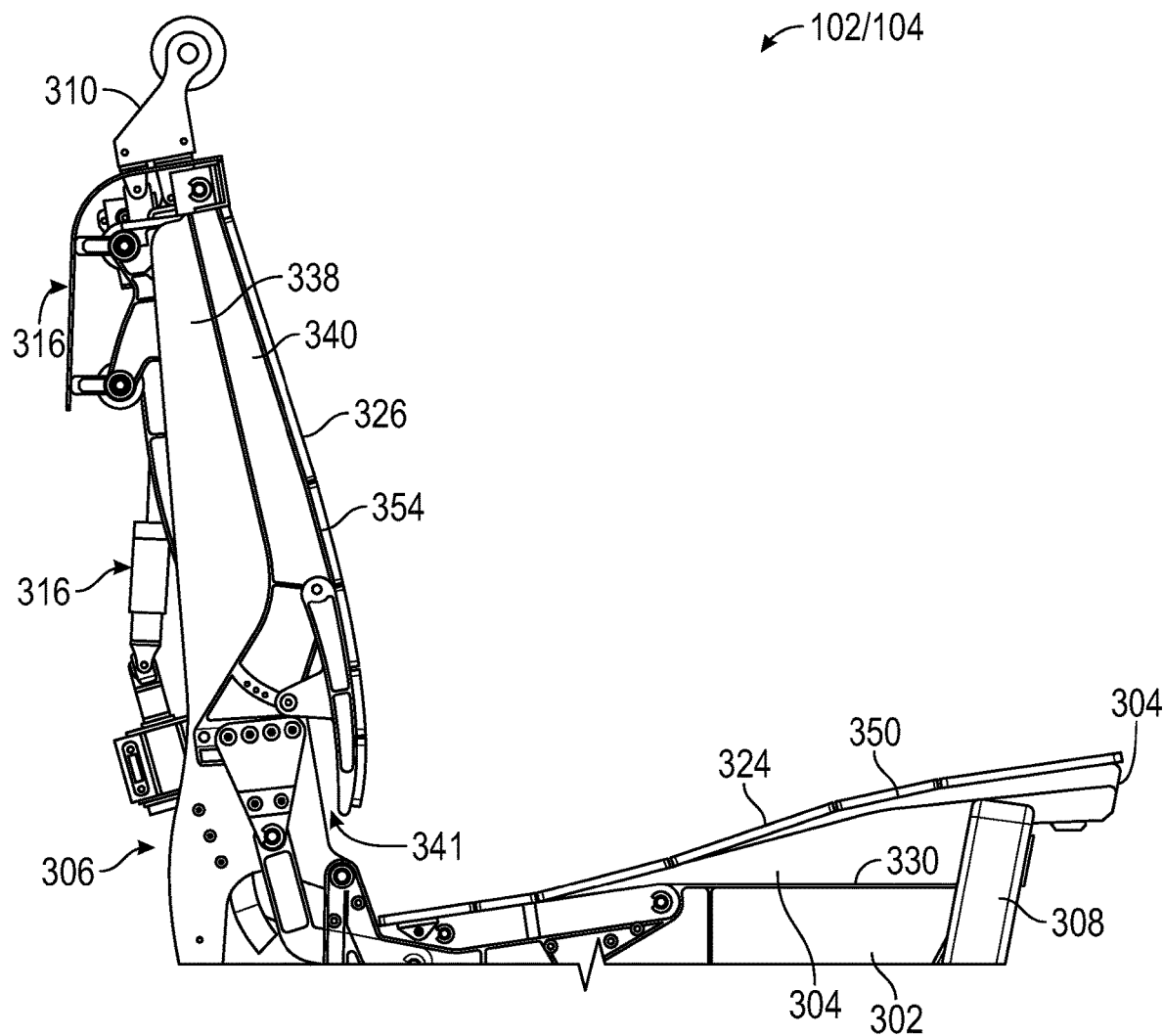

FIGS. 27, 29, and 30 illustrate the adjustable nature of the articulating frame 340 of the back rest support structure 306, which can be adjusted and set in a number of different positions to vary the lumbar support depth. More specifically, FIG. 27 shows the articulating frame 340 set in an intermediate position, FIG. 29 shows the articulating frame 340 set in a forward position, and FIG. 30 shows the articulating frame 340 set in a rearward position. The different positions can be selected by moving the bottom end of the articulating frame 340 forward/backward; the selected position can be fixed using screws, bolts, or any suitable fastener.

Figure 31:
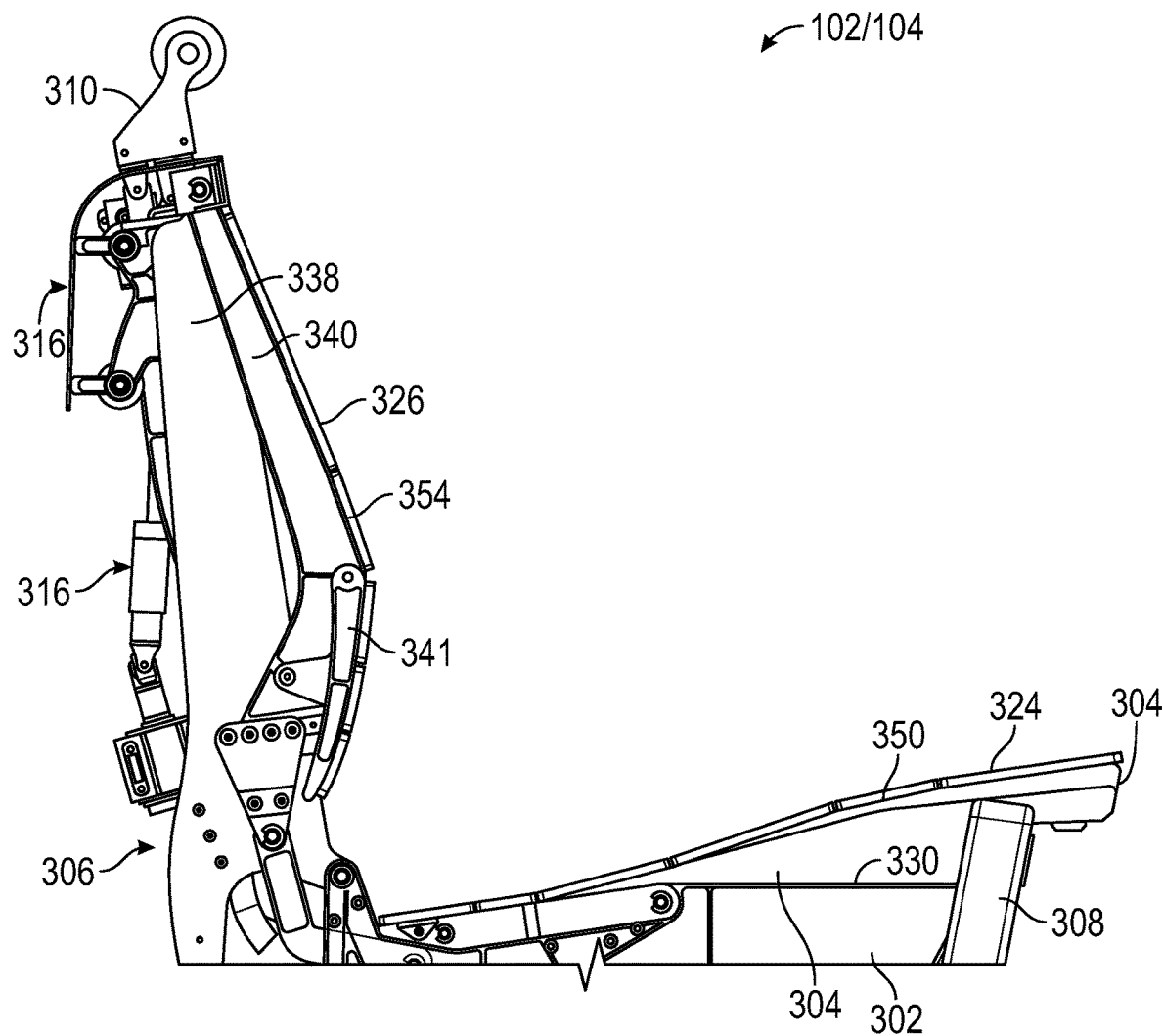

FIG. 29 and FIG. 31 illustrate the adjustable nature of the lumbar frame 341 of the back rest support structure 306, which can be adjusted and set in a number of different positions to vary the shape of the lumbar support. More specifically, FIG. 29 shows the lumbar frame 341 set in a forward position, and FIG. 31 shows the lumbar frame 341 set in a rearward position. One or more intermediate positions for the lumbar frame 341 may also be supported. The different positions can be selected by pivoting the lumbar frame 341 relative to the articulating frame 340; the selected position can be fixed using screws, bolts, or any suitable fastener.

As mentioned above, the positions of the articulating frame 340 and the lumbar frame 341 can be selected and fixed during fabrication or installation of the seat system 102, 104. In such embodiments, subsequent adjustments of the articulating frame 340 and the lumbar frame 341 may be inhibited due to lack of accessibility.

As mentioned above, the actuation system 202 is activatable to adjust the seating position of the seat system 102, 104. In this regard, the actuation system 202 can be controlled to adjust the positions and orientations of the various support structures relative to one another. For example, the actuation system 202 is activatable to adjust a tilt angle of the seat cushion by pivoting the seat pan support structure 304 relative to the base support structure 302. As another example, the actuation system 202 is activatable to adjust a tilt angle of the back rest cushion by pivoting the back rest support structure 306 relative to the base support structure 302. Moreover, the actuation system 202 is activatable to adjust a tilt angle of the leg cushion by pivoting the leg rest support structure 308 relative to the seat pan support structure 304. The figures demonstrate the manner in which the support structures move in concert with one another. To this end, the seat system 102, 104 may include an arrangement of movable, pivotable, and/or translatable links, rods, plates, or other elements that are coupled together in an appropriate manner. This arrangement of elements is actuated to move the back rest support structure 306, the seat pan support structure 304, and the leg rest support structure 308 in concert with one another. The arrangement of elements may also be suitably configured to move the neck rest support structure 310 in a cooperative manner. Alternatively or additionally, the seat system 102, 104 may include an independently controllable drive mechanism 316 devoted to the neck rest support structure 310.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A seat system comprising:
a base support structure comprising at least one flat seat support surface;
a seat pan support structure movably coupled to the base support structure, the seat pan support structure comprising at least one contoured seat support surface;
a seat cushion comprising:
an occupant-facing seat surface; and
an articulating arrangement of seat cushion support members movably coupled together to define a bottom surface of the seat cushion opposing the occupant-facing seat surface of the seat cushion; and
an electronically controlled actuation system that is activatable to adjust the seat system between an upright position and a flat position inclusive;
wherein the at least one contoured seat support surface supports the seat cushion when the seat system is in the upright position, such that the articulating arrangement of seat cushion support members physically adapts to comply with the at least one contoured seat support surface; and
wherein the at least one flat seat support surface supports the seat cushion when the seat system is in the flat position, such that the articulating arrangement of seat cushion support members physically adapts to comply with the at least one flat seat support surface.

2. The seat system of claim 1, wherein:
the electronically controlled actuation system is activatable to adjust the seat system into a reclined position between the upright position and the flat position; and
the at least one contoured seat support surface supports the seat cushion when the seat system is in the reclined position, such that the articulating arrangement of seat cushion support members physically adapts to comply with the at least one contoured seat support surface.

3. The seat system of claim 2, further comprising a powered neck support component controlled to automatically move in concert with adjustment of the seat system into the reclined position.

4. The seat system of claim 1, further comprising:
a leg rest support structure movably coupled to the base support structure; and
a leg cushion supported by the leg rest support structure.

5. The seat system of claim 1, further comprising:
a back rest support structure movably coupled to the base support structure; and
a back rest cushion supported by the back rest support structure.

6. The seat system of claim 5, wherein:
the back rest support structure comprises:
a primary frame comprising at least one flat back support surface; and
an articulating frame movably coupled to the primary frame, the articulating frame comprising at least one contoured back support surface;
the back rest cushion comprises:
an occupant-facing back rest surface; and
an articulating arrangement of back rest cushion support members movably coupled together to define a bottom surface of the back rest cushion opposing the occupant-facing back rest surface;

the at least one contoured back support surface supports the back rest cushion when the seat system is in the upright position, such that the articulating arrangement of back rest cushion support members physically adapts to comply with the at least one contoured back support surface; and the at least one flat back support surface supports the back rest cushion when the seat system is in the flat position, such that the articulating arrangement of back rest cushion support members physically adapts to comply with the at least one flat back support surface.

7. The seat system of claim 1, further comprising:
an ottoman component controlled to automatically move in concert with adjustment of the seat system into the flat position.

8. The seat system of claim 1, wherein:
when the seat system is adjusted into the upright position, the at least one contoured seat support surface causes a portion of the seat cushion to bulge such that the occupant-facing seat surface exhibits a convex side profile shape; and
when the seat system is adjusted into the flat position, the portion of the seat cushion flattens onto the at least one flat seat support surface such that the occupant-facing seat surface exhibits a nominally flat side profile shape.

9. The seat system of claim 1, wherein:
the electronically controlled actuation system is activatable to adjust a tilt angle of the seat cushion by pivoting the seat pan support structure relative to the base support structure.

10. A seat system comprising:
a base support structure;
a back rest support structure movably coupled to the base support structure, the back rest support structure comprising:
  a primary frame comprising at least one flat back support surface; and
  an articulating frame movably coupled to the primary frame, the articulating frame comprising at least one contoured back support surface;
a back rest cushion comprising:
  an occupant-facing back rest surface; and
  an articulating arrangement of back rest cushion support members movably coupled together to define a bottom surface of the back rest cushion opposing the occupant-facing back rest surface; and
an electronically controlled actuation system that is activatable to adjust the seat system between an upright position and a flat position inclusive;
wherein the at least one contoured back support surface supports the back rest cushion when the seat system is in the upright position, such that the articulating arrangement of back rest cushion support members physically adapts to comply with the at least one contoured back support surface; and
wherein the at least one flat back support surface supports the back rest cushion when the seat system is in the flat position, such that the articulating arrangement of back rest cushion support members physically adapts to comply with the at least one flat back support surface.

11. The seat system of claim 10, wherein:
the electronically controlled actuation system is activatable to adjust the seat system into a reclined position between the upright position and the flat position; and
the at least one contoured back support surface supports the back rest cushion when the seat system is in the reclined position, such that the articulating arrangement of back rest cushion support members physically adapts to comply with the at least one contoured back support surface.

12. The seat system of claim 10, further comprising:
a leg rest support structure movably coupled to the base support structure; and
a leg cushion supported by the leg rest support structure.

13. The seat system of claim 10, further comprising:
a seat pan support structure movably coupled to the base support structure; and
a seat cushion supported by the seat pan support structure.

14. The seat system of claim 13, wherein:
the seat pan support structure comprises at least one contoured seat support surface;
the seat cushion comprises:
  an occupant-facing seat surface; and
  an articulating arrangement of seat cushion support members movably coupled together to define a bottom surface of the seat cushion opposing the occupant-facing seat surface of the seat cushion;
the at least one contoured seat support surface supports the seat cushion when the seat system is in the upright position, such that the articulating arrangement of seat cushion support members physically adapts to comply with the at least one contoured seat support surface; and
at least one flat seat support surface of the base support structure supports the seat cushion when the seat system is in the flat position, such that the articulating arrangement of seat cushion support members physically adapts to comply with the at least one flat seat support surface.

15. The seat system of claim 10, wherein:
when the seat system is adjusted into the upright position, the at least one contoured back support surface causes a portion of the back rest cushion to bulge such that the occupant-facing back rest surface exhibits a convex side profile shape; and
when the seat system is adjusted into the flat position, the portion of the back rest cushion flattens onto the at least one flat back support surface such that the occupant-facing back rest surface exhibits a nominally flat side profile shape.

16. The seat system of claim 10, wherein:
the electronically controlled actuation system is activatable to adjust a tilt angle of the back rest cushion by pivoting the back rest support structure relative to the base support structure.

17. A seat system comprising:
a base support structure comprising at least one flat seat support surface;
a seat pan support structure movably coupled to the base support structure, the seat pan support structure comprising at least one contoured seat support surface;
a back rest support structure movably coupled to the base support structure, the back rest support structure comprising:
  a primary frame comprising at least one flat back support surface; and
  an articulating frame movably coupled to the primary frame, the articulating frame comprising at least one contoured back support surface;
a seat cushion comprising:
  an occupant-facing seat surface; and an articulating arrangement of seat cushion support members movably coupled together to define a bottom surface of the seat cushion opposing the occupant-facing seat surface of the seat cushion;
a back rest cushion comprising:
an occupant-facing back rest surface; and
an articulating arrangement of back rest cushion support members movably coupled together to define a bottom surface of the back rest cushion opposing the occupant-facing back rest surface; and
an electronically controlled actuation system that is activatable to adjust the seat system between an upright position and a flat position inclusive;
wherein the at least one contoured seat support surface supports the seat cushion when the seat system is in the upright position, such that the articulating arrangement of seat cushion support members physically adapts to comply with the at least one contoured seat support surface;
wherein the at least one contoured back support surface supports the back rest cushion when the seat system is in the upright position, such that the articulating arrangement of back rest cushion support members physically adapts to comply with the at least one contoured back support surface;
wherein the at least one flat seat support surface supports the seat cushion when the seat system is in the flat position, such that the articulating arrangement of seat cushion support members physically adapts to comply with the at least one flat seat support surface; and
wherein the at least one flat back support surface supports the back rest cushion when the seat system is in the flat position, such that the articulating arrangement of back rest cushion support members physically adapts to comply with the at least one flat back support surface.

18. The seat system of claim 17, wherein:
the electronically controlled actuation system is activatable to adjust the seat system into a reclined position between the upright position and the flat position;
the at least one contoured seat support surface supports the seat cushion when the seat system is in the reclined position, such that the articulating arrangement of seat cushion support members physically adapts to comply with the at least one contoured seat support surface; and
the at least one contoured back support surface supports the back rest cushion when the seat system is in the reclined position, such that the articulating arrangement of back rest cushion support members physically adapts to comply with the at least one contoured back support surface.

19. The seat system of claim 17, further comprising:
a leg rest support structure movably coupled to the base support structure;
a leg cushion supported by the leg rest support structure; and
an ottoman component controlled to automatically move in concert with adjustment of the seat system.

20. The seat system of claim 17, wherein:
when the seat system is adjusted into the upright position, the at least one contoured seat support surface causes a portion of the seat cushion to bulge such that the occupant-facing seat surface exhibits a convex side profile shape, and the at least one contoured back support surface causes a portion of the back rest cushion to bulge such that the occupant-facing back rest surface exhibits a convex side profile shape; and
when the seat system is adjusted into the flat position, the portion of the seat cushion flattens onto the at least one flat seat support surface such that the occupant-facing seat surface exhibits a nominally flat side profile shape, and the portion of the back rest cushion flattens onto the at least one flat back support surface such that the occupant-facing back rest surface exhibits a nominally flat side profile shape.

* * * * *